United States Patent
Uemura et al.

[11] Patent Number: 6,110,035
[45] Date of Patent: Aug. 29, 2000

[54] BLOWER UNIT AND AIR CONDITIONER EMPLOYING THE SAME

[75] Inventors: Yukio Uemura; Kenji Suwa; Kazushi Shikata, all of Kariya; Hiroshi Nonoyama, Toyota; Hikaru Sugi, Nagoya; Koji Takahashi, Kariya; Hideaki Inazawa, Kariya; Yasuhiro Sato, Kariya; Tetsuya Takechi, Kariya; Manabu Miyata, Obu, all of Japan

[73] Assignee: Denso Corporation, Kariya, Japan

[21] Appl. No.: 09/416,606

[22] Filed: Oct. 12, 1999

Related U.S. Application Data

[63] Continuation of application No. 08/882,124, Jun. 25, 1997.

[30] Foreign Application Priority Data

Jun. 26, 1996 [JP] Japan .................................. 8-166181
Mar. 19, 1997 [JP] Japan .................................. 9-66824

[51] Int. Cl.[7] .................................................. B60H 1/32
[52] U.S. Cl. ........................................ 454/121; 454/139
[58] Field of Search .................................. 454/121, 139, 454/156; 165/41, 42, 43

[56] References Cited

U.S. PATENT DOCUMENTS 4,779,672 10/1988 Seikou et al. ...................... 454/139 X
4,802,405 2/1989 Ichitani et al. ...................... 454/139 X
5,643,079 7/1997 Miyata et al. ........................... 454/139

FOREIGN PATENT DOCUMENTS 50-37208 10/1975 Japan .
6-255341 9/1994 Japan .

*Primary Examiner*—Harold Joyce
*Attorney, Agent, or Firm*—Harness, Dickey & Pierce, PLC

[57] ABSTRACT

According to the present invention, a blower unit includes a centrifugal fan, a fan casing forming a scroll-shaped air passage and accommodating the centrifugal fan, and a partition wall for partitioning an interior of the fan casing into first and second air passages in which different kinds of airs flow, respectively, in the axial direction. The partition wall is molded integrally to the fan casing so as to extend linearly from the inner wall surface of the fan casing toward a radial inside of the fan. The fan casing includes two divided cases having a divided face in the axial direction. In this way, the number of divided cases can be as well as the number of steps of assembling the fan casing can be reduced so that the work efficiency for assembling the fan casing is improved.

9 Claims, 13 Drawing Sheets

BLOWER UNIT AND AIR CONDITIONER EMPLOYING THE SAME

CROSS REFERENCE TO THE RELATED APPLICATIONS

This is a continuation of U.S. patent application Ser. No. 08/882,124, filed Jun. 25, 1997.

This application is based on and claims priority of Japanese Patent Application Nos. Hei. 8-166181 filed on Jun. 26, 1996, and Hei. 9-66824 filed on Mar. 19, 1997, the content of which are incorporated herein by reference.

BACKGROUND OF THE INVENTION

1. Field of the Invention

The present invention relates to a blower unit having an interior partitioned into two air passages, through which different kinds of air flow, respectively.

2. Description of Related Art

Conventionally, a blower unit having an interior partitioned into two air passages has been disclosed, for example, in JP-A-6-255341.

In this blower unit for an air conditioner for a vehicle, when the atmospheric temperature is low such as in winter season, outside air having a comparatively low humidity is introduced into one of the air passages and the outside air is blown to an inner surface of a windshield of the vehicle to attain defrosting effect while inside air having a comparatively high temperature is introduced to the other air passages to improve heating performance.

A detail of a blower unit 100 constituting the most upstream air portion in the air conditioner for the vehicle will be described briefly with reference to FIG. 18.

The blower unit 100 includes a fan casing 101 forming an air passage and a blower 102 disposed in the fan casing 101.

Air passages 104 and 105 are formed in the fan casing 101 by a partition wall 103 protruded from an inner wall. Further, suction ports 109 and 110 are formed in the fan casing 101 corresponding to the air passages 104 and 105, respectively.

The blower 102 is a centrifugal fan (Sirocco fan), which includes a first fan 106, a second fan 107 and a motor 108 for rotating the first and the second fans 106 and 107.

The first fan 106 and the second fan 107 are disposed coaxially with a rotary shaft of the motor 108 and rotated by the motor 108.

The first fan 106 is disposed in the air passage 104 to generate an air flow in the air passage 104 toward a passenger compartment of the vehicle. On the other hand, the second fan 107 is disposed in the air passage 105 to generate an air flow in the air passage 105 toward the passenger compartment of the vehicle.

An operation of the blower unit 100 described above will be described briefly. The suction port 109 communicates with the outside of the passenger compartment, and the suction port 110 communicates with the inside of the passenger compartment, so that the first and the second fans 106 and 107 are operated by the rotating the motor 108. In this way, the outside air outside the passenger compartment (hereinafter simply referred to as outside air) is introduced to the air passage 104, while the inside air in the passenger compartment (hereinafter simply referred to as inside air) is introduced to the air passage 105.

By the way, it is necessary for the fan casing 101 which accommodates the blower 102 to be constituted by assembling a plurality of case members, because the fan casing 101 is molded by using a die unit and should have the shape to be released from the die unit.

SUMMARY OF THE INVENTION

In view of the above, it is an object of the present invention to provide a blower unit having a divided structure, an interior of which is partitioned by a partition wall into two air passages, capable of reducing the number of divided portions and the number of assembling steps so that the work efficiency for assembling the blower unit is improved.

According to an aspect of the present invention, a partition wall for partitioning an interior of a fan casing is molded integrally to the fan casing so as to extend linearly from an inner wall surface of the fan casing toward a radial inside of a centrifugal fan, and the fan casing includes two divided cases having a divided face in the axial direction of the centrifugal fan.

In this way, since the partitioning wall is formed so as to linearly extend toward the radial inside of the centrifugal fan, the fan casing can be constructed with two divided cases having a divided face in the axial direction of the centrifugal fan. As a result, it is possible to reduce the number of divided portions of the case into two and to reduce the number of assembling steps for the fan casing, so that the work efficiency for assembling the fan casing can be improved.

Further, at least one of the first suction port and the second suction port may be molded integrally with a suction guide enlarging toward a radial outside of the centrifugal fan.

In this way, the fan casing can be constructed with two divided cases having a divided face in the axial direction of rotation of the centrifugal fan and the suction guide can be molded integrally with the fan casing.

As a result, air can be entered smoothly into the suction port by the suction guide without increasing the number of parts so that the suction resistance and noises at the suction port are reduced.

Further, the first fan may have a fan diameter different from that of the second fan, and the first suction port has an opening diameter different from that of the second suction port in accordance with a difference of said fan diameters. The electric motor is inserted into one of the first and second suction ports of the first fan and the second fan, which has the larger fan diameter.

In this way, the diameter of the fan to which the electric motor is inserted is made larger than that of the fan in which the electric motor is not inserted in the suction port so that the air blowing capacity of the fan to which the electric motor is inserted is enhanced to blow out a sufficient amount of air irrespective of the increase in the suction resistance.

Further, the centrifugal fan may have a partition portion formed between the first fan and the second fan so as to extend radially of the centrifugal fan, for partitioning the first fan and the second fan, and the centrifugal fan is inserted into the fan casing from the first suction port along the axial line as an inserting direction thereof such that the partition portion and the partition wall are disposed so as to be overlapped with each other in the inserting direction.

Since the partition wall and the partition portion are overlapped, air hardly flows to a portion between the partition wall and the partition portion to improve separation between the air flowing in the first air passage and the air flowing in the second air passage.

The above-described blower unit according to the present invention is preferably employed in an air conditioner for a vehicle, in which two different type of air, e.g., inside air and outside air, flow in two partitioned air passages, respectively.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF PREFERRED EMBODIMENTS

A first embodiment of the present invention will be described.

In this embodiment, a blower unit is applied to an air conditioner for a vehicle. Further, the air conditioner is installed in a passenger compartment of the vehicle.

Figure 1:
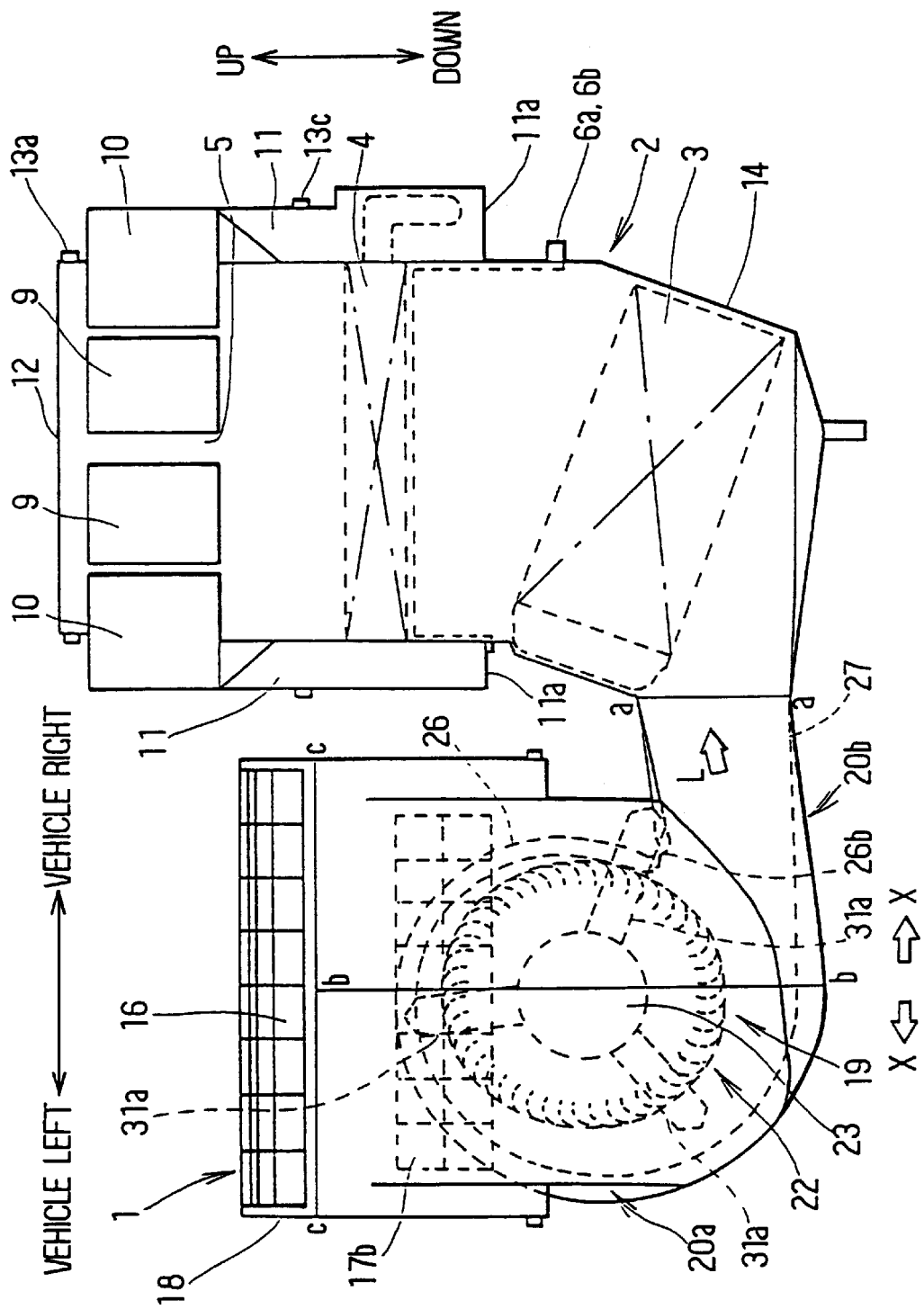
FIG. 1 is a view showing an entire constitution of an air conditioner for a vehicle, according to a first embodiment of the present invention.
Figure 2:
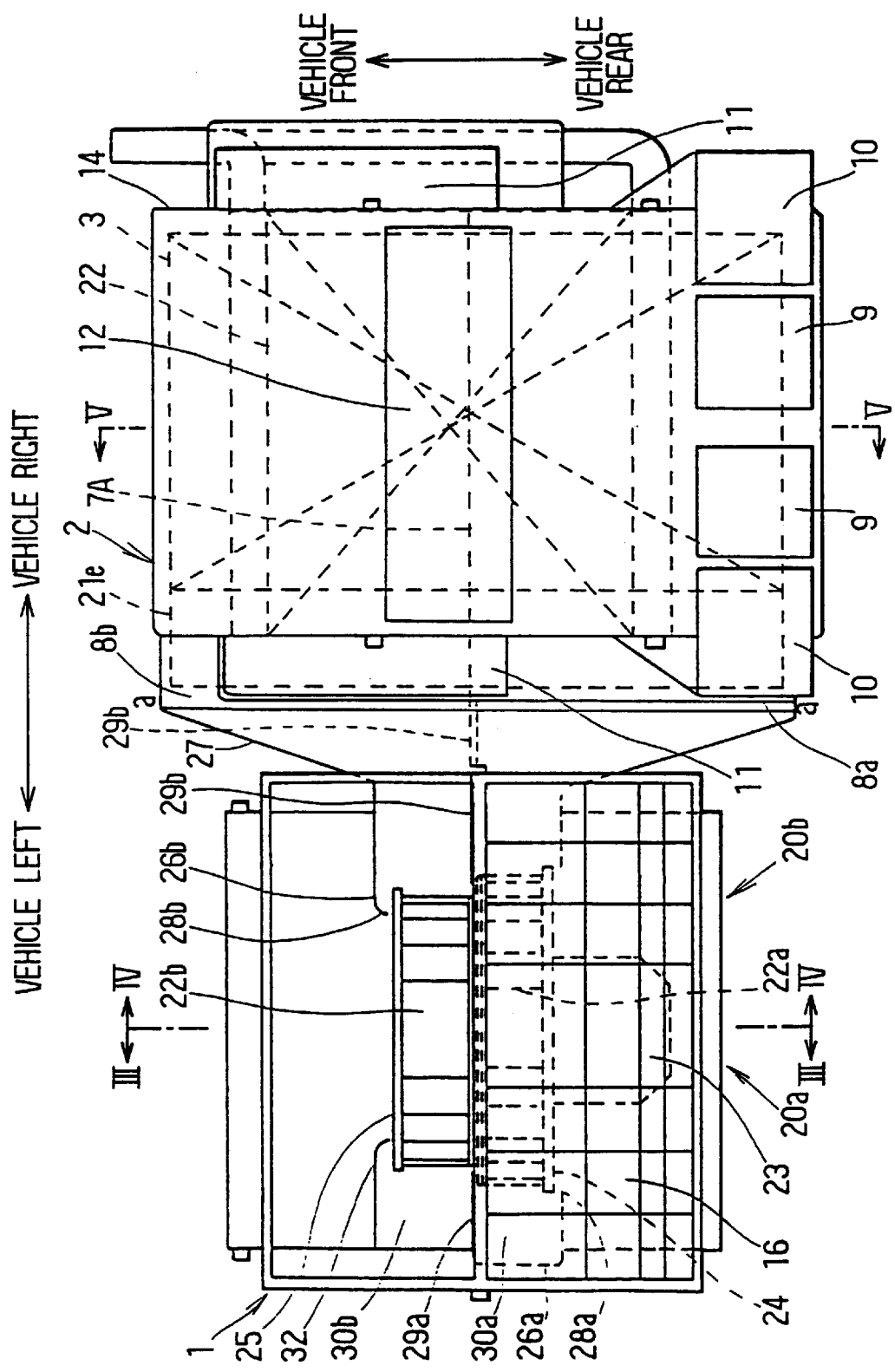
FIG. 2 is an upper plan view of the first embodiment as viewed from the upper side to the lower side in FIG. 1.
Figure 3:
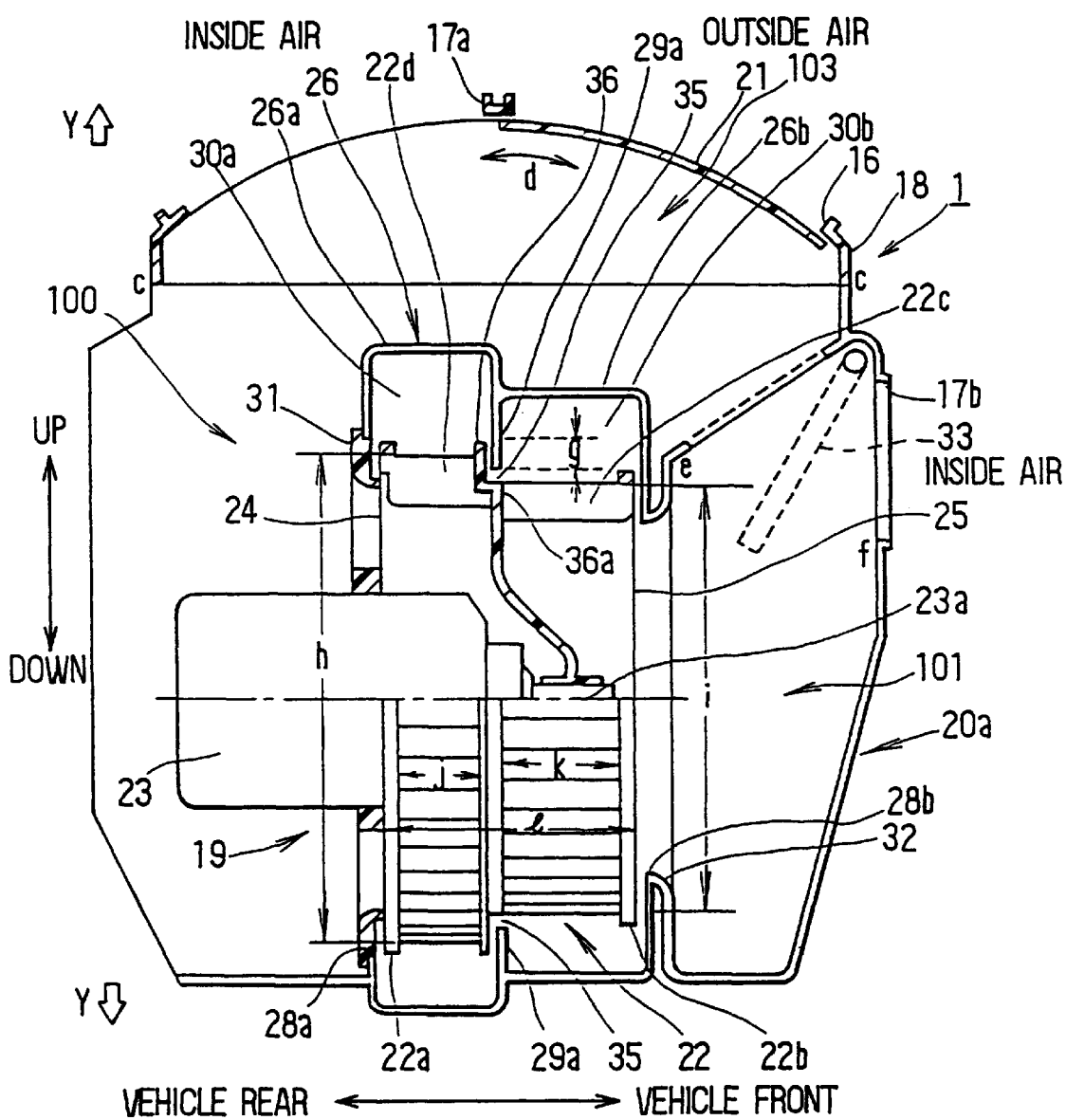
FIG. 3 is a cross sectional view taken along line III—III in FIG. 2.
Figure 4:
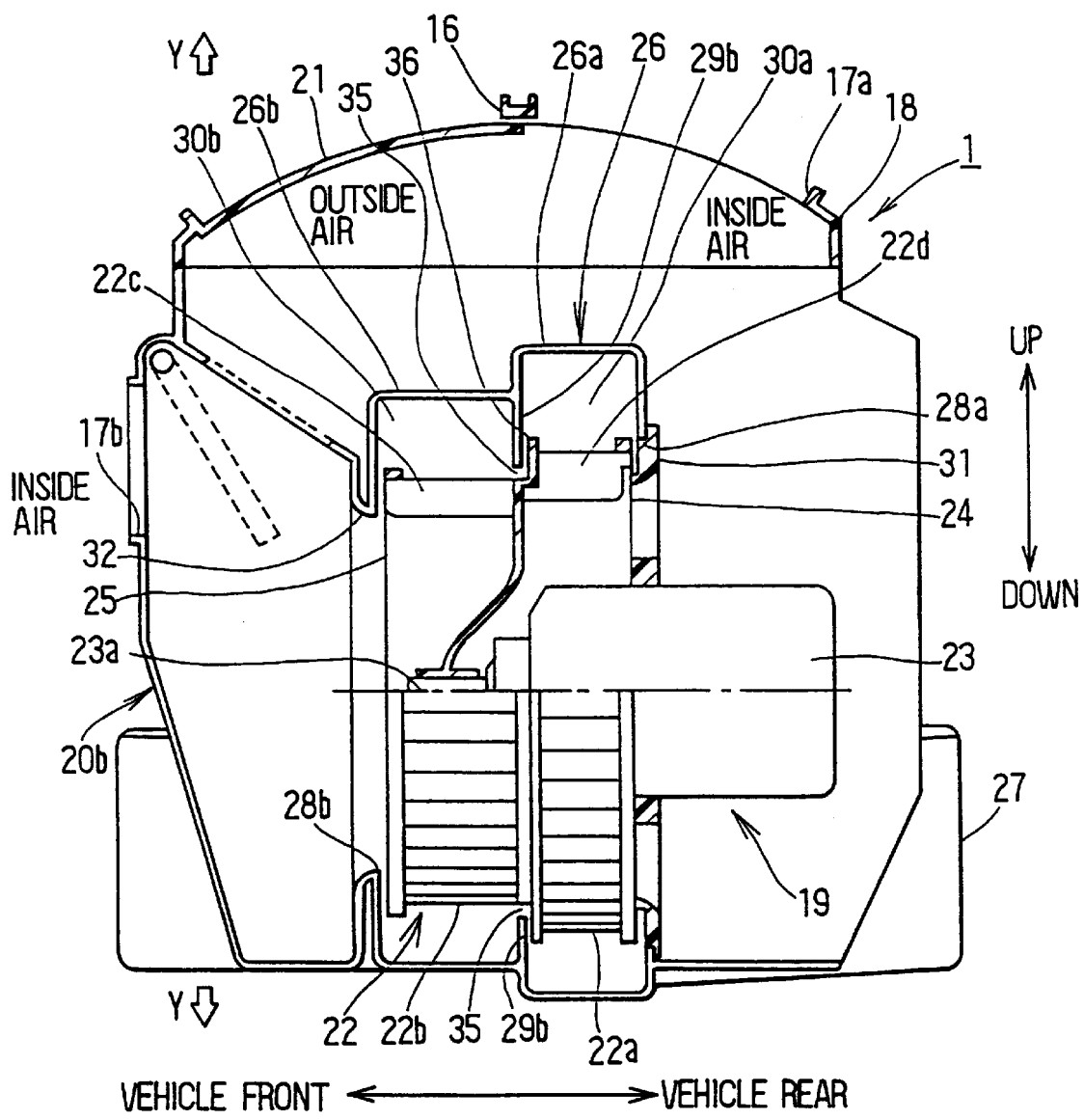
FIG. 4 is a cross sectional view taken along line IV—IV in FIG. 2.
Figure 5:
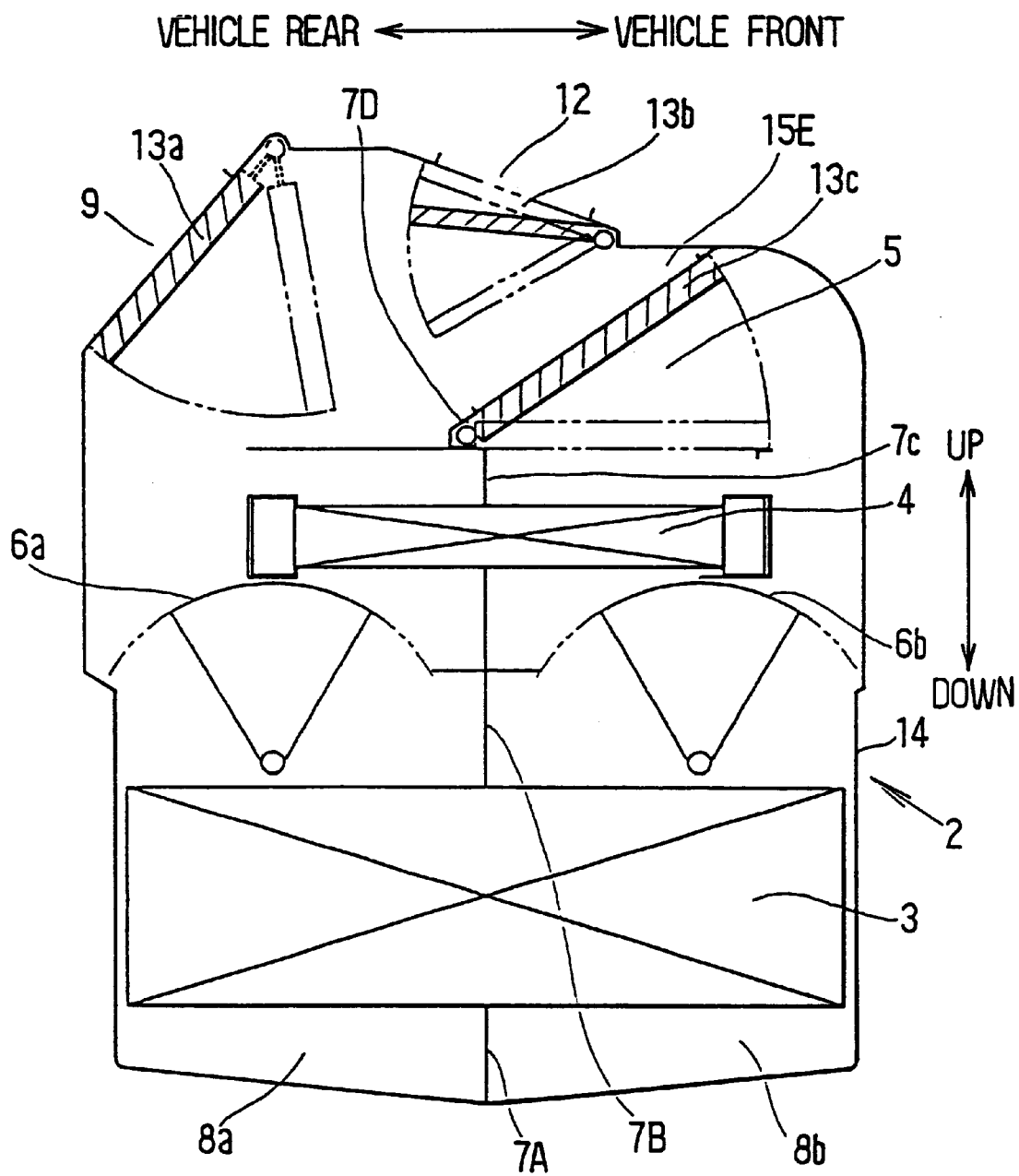
FIG. 5 is a cross sectional view taken along line V—V in FIG. 2.

FIG. 1 is a view showing an entire constitution of the air conditioner in the first embodiment, FIG. 2 is an upper plan view of the embodiment, as viewed from a top to a bottom (downwardly) in FIG. 1, FIG. 3 is a cross sectional view taken along line III—III of FIG. 2, FIG. 4 is a cross sectional view taken along line IV—IV of FIG. 2, FIG. 5 is a cross sectional view taken along line V—V of FIG. 2.

An inside air/outside air blower unit 1 disposed at the most upstream air side is biased from a central portion of an instrument panel (not shown) within the passenger compartment in a lateral direction of the vehicle (the leftward in the lateral direction of the vehicle in case of a right-hand steering wheel) and in front of a passenger seat next to a driver's seat.

The inside air/outside air blower unit 1 is for selectively introducing air in the passenger compartment (hereinafter referred to as inside air) or air outside the passenger compartment (hereinafter referred to as outside air) or introducing both of inside air and outside air to the inside, and an interior of the air passage is partitioned into a first passage 30a and a second passage 30b. A detail of the inside air/outside air blower unit 1 will be described more specifically later.

As shown in FIGS. 1 and 2, an air conditioning unit 2, into which an air conditioning heat exchanger is incorporated, is disposed at an air downstream side of the inside air/outside air blower unit 1. As shown in FIG. 1, the air conditioning unit 2 is disposed about at a central portion of an instrument panel in a passenger compartment. In the air conditioning unit 2, an evaporator 3 (cooling heat exchanger) for a refrigerating cycle is disposed at the air downstream of the first and the second air passages 30a and 30b. As shown in FIG. 1, the evaporator 3 is disposed substantially horizontally such that air blown from the inside air/outside air blower unit 1 enters from a lower side thereof.

A heater core (heat exchanger for heating) 4 is disposed substantially horizontally at an air downstream side of the evaporator 3 (an upper portion in the passenger compartment). The heater core 4 uses engine cooling water (hot water) as a heater source, and an air outlet mode switching portion 5 is disposed at the upper portion in the passenger compartment (at an air downstream side) of the heater core 4.

In this embodiment, an air mixing system for controlling a mixing ratio of cool air and warm air is employed as temperature control means for controlling a temperature of conditioned air. As shown in FIG. 5, a ratio between an amount of warm air passing through the heater core 4 and cool air bypassing the heater core 4 is controlled by opening degrees of air mixing doors 6a and 6b disposed below (at an air upstream side of) the heater core 4 in the passenger compartment, so that the temperature of conditioned air to blown into the passenger compartment is controlled. The air mixing doors 6a and 6b are of rotary doors each having an arcuate circumferential surface.

Instead of the air mixing door 6a and 6b, a hot water control value for controlling an amount of hot water flowing to the heater core 4 may be disposed. In this case, the amount of hot water flowing to the heater core 4 may be controlled by the hot water control valve and a heating amount of air is controlled by the heater core 4, so that the temperature of air blown into the passenger compartment can be controlled.

Also in the air conditioning unit 2, the inside air passage is partitioned by partition plates 7A, 7B and 7C into a first air passage 8a and a second air passage 8b, through which different kinds of air flow independently, respectively.

The air outlet mode switching portion 5 is for switching an air outlet mode of conditioned air to be blown into the passenger compartment and, as shown in FIG. 1, and includes a center face air passage 9 in communication with a center face (upper portion) air outlet (not shown) for blowing air toward a head portion of a passenger in the passenger compartment, a side face air passage 10 in communication with a side face air outlet (not shown), a foot air passage 11 in communication with a foot air outlet 11a for blowing air toward a foot portion of the passenger in the passenger compartment, and a defroster air passage 12 in communication with a defroster air outlet (not shown) for blowing air toward an inner surface of a windshield (not shown) of the vehicle, and a plurality of these air passages 9, 11 and 12 are selectively opened or closed by door means. In this embodiment, plate-like doors 13a, 13b and 13c are employed as shown in FIG. 5 as the door means for switching the air outlet mode.

In FIG. 5, the door 13a is a face door, the door 13b is a defroster door, and the door 13c is a foot door. FIG. 5 shows operational positions of doors 13a to 13c in the foot mode. When the foot door 13c is operated to a dotted chain position in FIG. 5, an inlet for the foot air passage 11 (not shown in this figure) is closed. The side face air passage 10 is, as being known well, always in communication with a space in the air outlet mode switching portion, and is opened or closed by an operation of an air outlet grill (not shown) mounted on the side face air outlet, so that air blown out from the side face air outlet can be intermitted and the direction of the air from the side face air outlet can be adjusted.

In this embodiment, a plurality of air passages 9, 11 and 12 are selectively opened or closed by selecting operational (rotational) positions of the plate-like doors 13a, 13b and 13c shown in FIG. 5 so that any one of a plurality of air outlet modes including a face air outlet mode, a bi-level air outlet mode, a foot air outlet mode, a foot/defroster air outlet mode, a defroster blowing mode, and the like.

A casing 14 for the air conditioning unit 2 shown in FIGS. 1, 2 and 5 includes a resin casing divided vertically into four portions. That is, the casing 14 is divided into four portions including a lower case for accommodating the evaporator 3, an intermediate case for accommodating the heater core 4 and two upper front and back cases for constituting the air outlet mode switching portion 5, into which components such as heat exchangers and doors are incorporated. The partition plates 7A, 7B and 7C are molded integrally to the inner wall surface of the resin casing.

Divided casings in the inside air/outside air blower unit 1 and the air conditioning unit 2 are detachably connected by using elastic metal clips or screws.

Further, the evaporator 3 is disposed to be slightly inclined from a horizontal plane to improve draining performance of condensed liquid generated by cooling effect thereof. That is, as shown in FIG. 1, the evaporator 3 is disposed to be inclined downward relative to the forward direction of the air (rightward in FIG. 1), which is blown by the inside air/outside air blower unit 1 toward the bottom of the evaporator 3.

Further, as shown in FIG. 5, the partition plate 7C disposed at a downwind side of the heater core 4 has a shape in which an upper portion thereof is bent obliquely toward the upper right side, and communication port 15E for communicating the first air passage 8a with a second air passage 8b is provided in the obliquely bent surface 7D of the partition plate 7C.

The communication port 15E is opened or closed by the foot door 13c. In the foot air outlet mode, the communication port 15E is fully closed. In the foot air outlet mode or foot/defroster air outlet mode, the communication port 15E is fully closed. In the face air outlet mode or defroster air outlet mode, the communication port 15E is fully opened. In the bi-level air outlet mode, the communication port 15E is fully closed or partially opened.

As shown in FIG. 5, the center face air passage 9 and the defroster air passage 12 are disposed on the side of the first air passage 8a, while the foot air passage 11 is disposed on the side of the second air passage 8b. Further, although not shown in FIG. 5, the side face air passages 10 are disposed on the side of the first air passage 8a.

An operation of this embodiment having the above-described construction will be described briefly.

In FIG. 1, air having flowed from the inside air/outside air blower unit 1 passes substantially horizontally and flows into a portion below the evaporator 3. Then, the air is dehumidified and cooled by the evaporator 3, further flows upward and is introduced to the heater core 4 to be heated therein.

In this embodiment, the air mixing doors 6a and 6b are used as an air conditioning temperature control means, and the ratio between the amount of air passing through the heater core 4 and the amount of air bypassing the heater core 4 is adjusted by the opening degrees of the air mixing doors 6a and 6b. In this way, it is possible to produce desired temperature of the blown-air. Then, the conditioned air heated again to a desired temperature by the heater core 4 is distributed by each of doors 13a to 13c of the air outlet mode switching portion 5 in the upper case.

The inside air/outside air blower unit 1 will be described in detail.

The inside air/outside air blower unit 1 in this embodiment includes four cases made of a resin material such as polypropylene and having divided faces (joined faces) a—a, b—b and c—c in FIG. 1. More specifically, the inside air/outside air blower unit 1 includes, as shown in FIGS. 3 and 4, an inside air/outside air case 18 in which an outside air introduction port 16 and a first inside air introduction port 17a are molded integrally, fan casings 20a and 20b for accommodating a blower 19, and a cover case (not shown) through which the blower 19 is inspected or changed.

Since the cross sections along III—III and IV—IV in the fan casings 20a and 20b in FIG. 2 constitute divided faces (joined face) of the fan casings 20a and 20b, the fan casings 20a and 20b in FIGS. 3 and 4 are not shown with hatching.

As shown in FIGS. 3 and 4, the upper portion of the inside air/outside air case 18 has an arcuate cross section, and the outside air introduction port 16 and the first inside air introduction port 17a are formed along the circumferential direction of the arcuate cross sectional shape. The outside air introduction port 16 is connected to a duct (not shown) in communication with an outside air suction port (not shown) opened to the side of the vehicle.

Then, the outside air introduction port 16 and the first inside air introduction port 17a are opened or closed by a rotary door 21 having a circumferential surface of an arcuate cross sectional shape. The rotary door 21 is rotatable in the direction of an arrow d in FIG. 3 by a pair of arms (not shown) supported to the fan casings 20a and 20b.

As described above, the blower casings 20a and 20b are for accommodating the blower 19. The blower 19 in this embodiment is generally referred to as an eccentric multi-blade fan (Sirocco fan) and includes a fan 22 and an electric motor 23 for rotating the fan 22 as shown in FIGS. 2 to 4.

The fan 22 is formed with a resin material such as polypropylene and includes, as shown in FIGS. 2 to 4, fans having different outer diameters from each other (fan diameter) in this embodiment, i.e., a first fan 22*a* having a large outer diameter (fan diameter) and a second fan 22*b* having a small diameter smaller than that of the first fan 22*a*, which are molded integrally.

Further, the first and the second fans 22*a* and 22*b* have suction ports 24 and 25 on both ends in the axial direction respectively as shown in FIGS. 3 and 4. In this embodiment, the fan 22 is disposed such that the axial direction of the rotary shaft extends substantially in a horizontal direction.

In this way, the first fan 22*a* sucks air from the suction port 24 from the back to the front of the vehicle and blows out air in the lateral direction of the vehicle, while the second fan 22*b* sucks air from the suction port 25 from the front to the back of the vehicle and blows out air in the lateral direction of the vehicle.

As shown in FIG. 1, the fan casings 20*a* and 20*b* are divided radially outwardly of the fan 22 along the divided face b—b, and have a divided face in the axial direction. When the fan casings 20*a* and 20*b* are assembled, there is formed a scroll case portion 26 constituting a scroll-shape air passage for accommodating the blower 19.

As shown in FIG. 1, the fan casing 20*a* is formed in a substantially semi-circular cup-shape to constitute mainly an air upstream portion of the scroll case portion 26. On the other hand, the fan casing 20*b* constitutes mainly an air blowing portion of the scroll case portion 26 as shown in FIG. 1.

The fan casing 20*b* is integrally formed with a blowing portion 27 for blowing a swirling air flow by the blower 19 toward the evaporator 3 straight forward in the lateral direction of the vehicle as shown in FIG. 1. The blowing portion 27 of the fan casing 20*b* is formed such that the air passage is enlarged toward the evaporator 3 in the front-to-back direction of the vehicle as shown in FIG. 2.

That is, the fan casings 20*a* and 20*b* are divided into upstream and downstream portions in the flowing direction of the blown-air (shown by an arrow L in FIG. 1).

In the scroll case portion 26, the first and the second fans 22*a* and 22*b* of different outer diameters described above are accommodated as shown in FIGS. 3 and 4. The scroll case portion 26 has, as shown in FIGS. 2 to 4, a first scroll case portion 26*a* for accommodating the first fan 22*a* and a second scroll case portion 26*b* for accommodating the second fan 22*b* corresponding to the outer diameters of the first and the second fans 22*a* and 22*b*, respectively.

As shown in FIGS. 3 and 4, a first suction port 28*a* is opened circularly corresponding to the first fan 22*a* at one end in the axial direction of the fan 22 in the swirling central portion of the scroll case portion 26. As shown in FIGS. 3 and 4, a second suction port 28*b* is opened circularly corresponding to the second fan 22*b* at the other end in the axial direction of the fan 22 in the swirling central portion of the scroll case portion 26. The diameter of the first suction port 28*a* is set to be greater than that of the second suction port 28*b* in accordance with the diameters of the corresponding fans, respectively.

A bell mouse-like suction guide 32 is molded integrally to the opening edge of the second suction port 28*b* such that the suction guide is protruded outward of the scroll case portion 26 and enlarged radially outwardly, as shown in FIGS. 3 and 4. The suction guide 32 is for smoothing a flow of air into the second suction port 28*b*, so that the suction efficiency of air can be improved and noise at the time of suction can be reduced.

Further, as shown in FIGS. 3 and 4, an interior of the scroll case portion 26 is partitioned into two air passages of a first passage 30*a* and a second passage 30*b* by partition walls 29*a* and 29*b* so as to be arranged in the front-to-back direction of the vehicle.

As shown in FIG. 3, in the fan casing 20*a*, the partition wall 29*a* is molded integrally along the outer shape of the fan 22 at the back side of the drawing sheet, and along the inner circumferential surface of the scroll case portion 26.

On the other hand, as shown in FIG. 4, in the fan casing 20*b*, the partition wall 29*b* is molded integrally along the outer shape of the fan 22 at the back side of the drawing sheet, and along the inner circumferential surface of the scroll case portion 26. Then, the partition wall 29*b*, as shown in FIG. 2, is formed along the outer shape of the fan 22 and up to the air passage 27 extending in the lateral direction of the vehicle and connected to the air conditioning unit 2.

In a state where the inside air/outside air blower unit 1 and the air conditioning unit 2 are connected, the first passage 30*a* is in communication with the first air passage 8*a*, while the second passage 30*b* is in communication with the second air passage 8*b*, as shown in FIG. 2.

By the way, the partition walls 29*a* and 29*b* are formed radially inwardly of the fan 22 to extend linearly, as shown in FIGS. 3 and 4. The fan casings 20*a* and 20*b* are constituted to have a divided face in the axial direction of the fan 22 as shown in FIG. 1.

On the contrary, if the top end of the partition wall 29*a* at the back side of the drawing sheet in FIG. 3 is bent in a right-to-left direction in FIG. 3, the two fan casings 20*a* and 20*b* cannot be formed as in this embodiment, because these casings 20*a* and 20*b* cannot be released from the die unit after molded. That is, if the partition walls 29*a* and 29*b* have bent shapes, the partition walls 29*a* and 29*b* have to be formed separately.

As a result, the other structure, which constitutes a fan casing having the partition walls 29*a* and 29*b*, needs, for example, at least three case parts, i.e., two cases divided in the right and left direction in FIG. 3 and a separately formed partition wall. Accordingly, the number of parts is increased as compared with this embodiment and the work efficiency for assembling the case is deteriorated.

In this embodiment, as described above, the partition wall 29 is formed radially inwardly of the fan 22 to extend linearly, and the scroll case portion 26 is structured to have a divided face in the axial direction of the fan 22. In this way, the scroll case portion 26 for accommodating the fan 22 can be constructed with two cases, and the number of components can be reduce to improve the work efficiency for assembling the case.

FIG. 1 shows a direction where a main die unit for the fan casings 20*a* and 20*b* is released in this embodiment. FIG. 3 shows a direction where a slide die unit for the fan casing 20*a* is released. FIG. 3 shows a direction where a slide die unit for the fan casing 20*b* is released.

Further, as shown in FIGS. 3 and 4, a suction guide 32 of the fan casing 20*a* is formed by sliding downwardly a thin plate slide die (not shown) having an arcuate top end in the lower portion of the figure, and sliding upwardly a thin plate slide die (not shown) in the upper portion of the figure.

Further, as shown in FIGS. 4, a suction guide 32 of the fan casing 20*b* is formed by sliding downwardly a thin plate slide die (not shown) having an arcuate shape top end in the lower portion of the figure, and by sliding upwardly a thin plate slide die (not shown) in the upper portion of the figure.

Thus, the suction guide 32 is formed so as to protrude to the outside of the scroll case portion 26, and the suction guide 32 can be formed integrally without an influence on a die split structure when the scroll case portion 26 is formed into a structure having a divided face in the axial direction of the fan 22. In this way, the number of parts can be reduced.

Further, in this embodiment, since the second inside air introduction port 17b is formed integrally to the fan casings 20a and 20b, the number of parts in the entire inside air/outside air blower unit 1 can be further reduced.

Then, a method of assembling the inside air/outside air blower unit 1 will be described briefly.

In the method of assembling the inside air/outside air blower unit 1, the fan casings 20a and 20b are firstly assembled from the right-to-left direction in FIG. 1 and fastened, for example, by fastening means such as a claw fitting and a C-shaped clip. In this way, the scroll case portion 26 and the second inside air introduction port 17b are formed.

Next, the blower 19 is assembled in the scroll case portion 26. In this process, the blower 19 is firstly assembled such that, as shown in FIG. 3, the electric motor 23 is inserted into the suction port 24 of the first fan 22a having a larger outer diameter of the first and the second fans 22a and 22b, and a rotary shaft 23a of the electric motor 23 is attached to the center of the partition portion 36 (described later). Subsequently, as shown in FIG. 3, an annular mounting stay 31 is attached to the outer circumferential surface of the electric motor 23.

Then, the assembled blower 19 is inserted from the first section port 28a into the scroll case portion 26 along the axial direction (right to left direction in FIG. 3) as the insertion direction, and the mounting stay 31 is fit into the first suction port 28a.

Subsequently, the mounting stay 31 is secured to the scroll case portion 26 by fastening means such as screws to secure the blower 19 to the scroll case portion 26. Three stay portions 31a are formed to the annular mounting stay 31 so as to extend toward the center as shown in FIG. 1, and the electric motor 23 is supported by the three stay portions 31a. Thus, the blower 19 can be assembled to the scroll case portion 26 easily.

When the blower 19 is attached to the scroll case portion 26 as described above, the first fan 22a is disposed to the first passage 30a, while the second fan 22b is disposed to the second passage 30b.

Subsequently, the inside air/outside air case 18 is attached from the upper side to the fan casings 20a and 20b as shown in FIG. 1 and secured by fastening means such as screws and C-shaped clips, and a cover case (not shown) is attached from the rear side to the front side of the vehicle in FIGS. 3 and 4 to assemble the inside air/outside air blower unit 1. Further, when the cover case (not shown) is detached, the blower 19 can be checked or changed easily from the inside of the passenger compartment.

Then, the constitution of the air passage at the inside of the inside air/outside air blower unit 1 will be explained briefly.

As shown in FIG. 3 and 4, in the inside air/outside air blower unit 1, there are formed a first air passage 100 for communicating the first inside air introduction port 17a with the first suction port 28a, a second air passage 101 for the communicating a second inside air introduction port 17b with a second suction port 28b, and a communication passage 103 for communicating the first air passage 101 with the second air passage 102.

The communication passage 103 communicates the first suction port 28a with the second suction port 28b at the upstream side of the first suction port 28a and the second suction port 28b. Further, the second inside air introduction port 17b and the communication passage 103 are opened or closed by a switching door 33 as an opening/closing member.

Then, in this embodiment, the following inside air/outside air mode can be set by the rotary door 21 and the switching door 33. The rotary door 21 and the switching door 33 are actuated, for example, by a servo motor as electric driving means.

(1) Whole Inside Air Mode

By operating the rotary door 21 as shown in FIG. 3, the first inside air introduction port 17a is opened, while the outside air introduction port 16 is closed, and the second inside air introduction port 17b is operated to the position shown by "e" in FIG. 3 by the switching door 33 to close the second inside air introduction port 17b, and the communication passage 103 is closed (a third predetermined position). Then, the inside air is sucked by both the first and the second fans 22a and 22b and is introduced to both of the first passage 30a (first air passage 8a) and a second passage 30b (second air passage 8b).

(2) Double Laminar Flow Mode

By operating the rotary door 21, the outside air introduction port 16 is opened while the first inside air introduction port 17b is closed. Further, the switching door 33 is operated to the position shown by "e" in FIG. 3 to close the communication passage 103 and open the second inside air introduction port 17b (second predetermined position). Then, outside air is sucked into the first fan 22a and is blown through the first passage 30a to the first air passage 8a. On the other hand, an inside air is sucked into the second fan 22b and is blown to the second air passage Bb through the second passage 30b.

(3) Whole Outside Air Mode

By operating the rotary door 21, the outside air introduction port 16 is opened while the first inside air introduction port 17a is closed. Further, the switching door 33 is operated to the position shown by "f" in FIG. 3 to open the communication passage 103 and close the second inside air introduction port 17b (first predetermined position). Then, the outside air from the outside air introduction port 16 is sucked into the first fan 22a and is sucked through the communication passage 103 into the second fan 22b. Thus, outside air is blown to both of the first and the second air passages 8a and 8b by way of the first and the second passages 30a and 30b.

As described above, in this embodiment, since the air conditioner for the vehicle is, namely, the fan casings 20a and 20b are, disposed in the passenger compartment, the single outside air introduction port 16 is just provided. In this way, it is possible to easily connect the outside air introduction port 16 to an outside air suction port (not shown) opened to the side of the vehicle through a duct (not shown) and to simplify the arrangement of the duct.

Further, according to this embodiment, in the winter season when the heating operation is necessary, it is possible to select the double laminar flow mode in which outside air and inside air are blown and heat-exchanged while partitioned and warm air produced by heating outside air having a low humidity is blown out from a defroster whereas warm air produced by heating inside air is blown out from the foot air outlet 11a.

That is, the inside of the inside air/outside air blower unit 1 is partitioned by the partition walls 29a and 29b into two air passages of first and second passages 30a and 30b. Further, also the interior of the air conditioning unit 2 is partitioned by partition plates 7A to 7C into two first air passage 8a and second air passage 8b. Further, the communication port 15E of the first and the second passages 8a and 8b at the air downstream side of the heater core 4 is closed by the foot door 13c in the foot mode or the foot/defrost mode. Accordingly, in both of these modes, outside air entering the first air passage 8a passes through the evaporator 3 and the heater core 4, then passed through the defroster air passage 12 and the side face air passage 10, and is blown toward the windshield and the upper body half of the passenger. Since the outside air having a low humidity is heated into warm air by the heater core 4, the effect for defrosting the windshield can be improved.

On the other hand, inside air is blown to the second air passage 8b, is heated by the heater core 4 into warm air, and is blown out through the foot air passage 11 from the foot air outlet 11a toward feet of the passenger. Accordingly, when heating a foot portion in the passenger compartment, ventilation load due to introduction of outside air is not caused and the heating effect can be improved even under the condition in which the temperature of engine cooling water flowing into the heater core is not increased sufficiently (for example, during an idling operation of the vehicle having a diesel engine). As a result, both of the improvement in the effect for defrosting the windshield and improvement in heating effect can be obtained.

By the way, as shown in FIGS. 3 and 4, a gap (space) 35 is required to some extent between the partition walls 29a, 29b and the fan 22 in the inside air/outside air blower unit 1 in order not to disturb the rotation of the fan 22. However, since the first passage 30a communicates with the second passage 30b through the gap 35, there occurs a problem in that the separation of the inside air and the outside air passing through the first and the second air passages 8a and 8b in the double laminar flow mode is deteriorated, and the effect for defrosting the windshield and the heating effect are lowered.

To overcome this problem, in this embodiment as shown in FIGS. 3 and 4, a partition portion 36 is formed integrally to the fan 22 between the first fan 22a and the second fan 22b such that outside air sucked by the first fan 22a and the inside air sucked by the second fan 22b do not cross each other in the axial direction (front-to-back direction of the vehicle in FIG. 3).

The partition plate 36 is formed into a generally conical shape so as to extend in the radial direction of the fan 22. The rotational shaft 23a of the electric motor 23 is fitted and fixed to the center of the partition portion 36. Further, in this embodiment, a stepped portion 36a is formed in the partition portion 36.

Then, in this embodiment, when the blower 19 is attached to the scroll case portion 26, the outer circumference of the partition portion 36 and the top end of the partition walls 29a and 29b are disposed to be overlapped in the axial direction of the fan 22 as shown in FIGS. 3 and 4. Further, the top ends of the partition walls 29a and 29b are opposed to the stepped portion 36a.

That is, if the top ends of the partition walls 29a and 29b are opposed to the top end of the partition portion 36, the outside air of the first passage 30a and the inside air of the second passage 30b are mixed easily through the gap 35.

However, in this embodiment, since the outer circumference of the partition portion 36 and the top ends of the partition walls 29a and 29b are disposed so as to be overlapped in the axial direction of the fan 22, even if the inside air flowing in the second air passage 8b leaks through the gap 35 to the first air passage 8a for instance, the leaked inside air has to pass the gap 35 after passing through a gap at a portion where the partition portion 36 and the partition wall 29 are overlapped.

In this way, since it becomes difficult for the inside air to pass through the gap 35, the separation between the inside air and the outside air can be improved.

Figure 6:
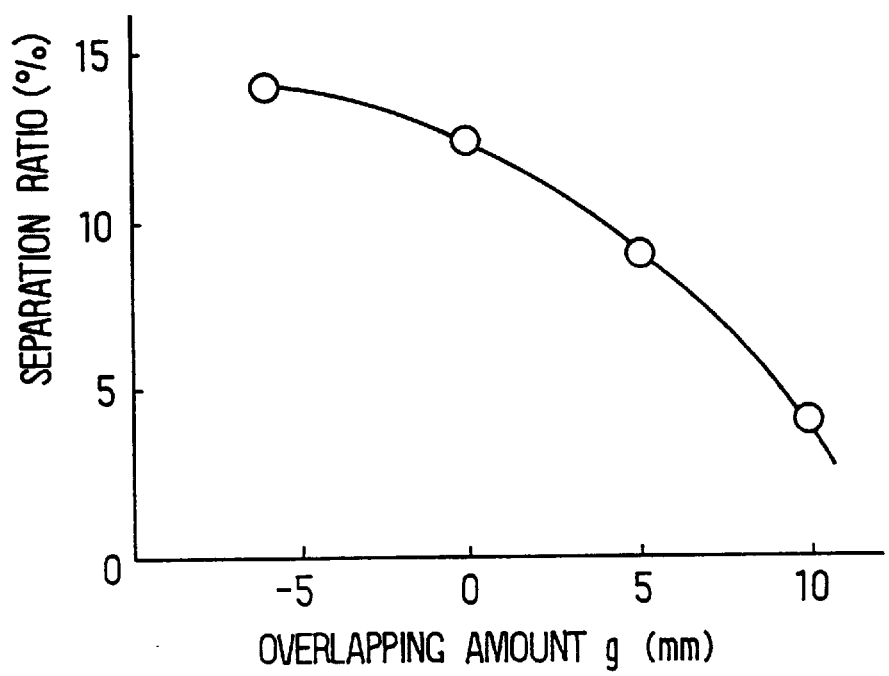
FIG. 6 is a graph showing a relationship between the overlapping amount "g" of a partition walls 29a, 29b and a partition portion 36 and a ratio of separation in the first embodiment.

FIG. 6 shows a correlation between the separation of the inside air and the outside air, and the overlapping amount of the partition wall 29 and the partition portion 36 (overlapping amount in the radial direction of the fan 22, that is, the amount shown by arrow "g" in FIG. 3) studied by the inventors of the present invention.

In FIG. 6, the ordinate represents the ratio of the amount of inside air flowing from the second passage 30b through the gap 35 to the first passage 30a based on the entire amount of outside air sucked by the first fan 22a as a separation ratio (%).

In this case, a negative overlapping amount "g" indicates that the partition wall 29 and the partition portion 36 are not overlapped but the top end of the partition wall 29 and the top end of the partition portion 36 are separated, and the negative amount "g" represents the distance between the top ends.

As can be understood therefrom, the separation ratio is improved as the overlap amount g increases. According to the study of the inventors, the overlap amount of 3 mm or more is practically suitable to obtain the effect for defrosting the windshield and the heating effect, because the separation ratio can be maintained to be less than 10%. In this embodiment, the overlapping amount "g" is set for 3 mm.

Further, in this embodiment, the outer diameter of the first fan 22a is set to be greater than that of the second fan 22b based on the following reasons.

In the foot/defroster mode in this embodiment, the amount ratio between the outside air flowing the first air passage 8a and the inside air flowing in the second air passage 8b is set as substantially 5:5 when the side face air outlet is closed by a passenger.

Then, since an extended duct or the like is connected to the outside air introduction port 16 as described above, when the outside air is introduced from the outside air introduction port 16 into the first air passage 8a, the suction resistance is increased as compared with the case when the inside air is sucked, so that air hardly flows in the first air passage 8a as compared with the second air passage 8b to lower the air amount flowing from the side face air outlet, the center face air outlet and the defroster air outlet, disposed at the downstream sides of the first air passage 8a.

Further, in this embodiment, since the electric motor 23 is inserted in the suction port of the first fan 22a, the suction resistance of the first fan 22a is increased to lower the air amount flowing from the side face air outlet, the center face air outlet and the defroster air outlet.

Accordingly, in this embodiment, to ensure a sufficient air amount to the first air passage 8 by the first fan 22a and to set the ratio of air amounts between the first air passage 8 and the second air passage 8b to substantially as 5:5, the outer diameter of the first fan 22a is set to be larger, such that the air blowing capacity of the first fan 22a for blowing air to the first air passage 8a is greater than that of the second fan 8a for blowing air to the second air passage 8b.

In this embodiment, the outer diameter of the first fan 22a (shown by arrow "h" in FIG. 3) is set for 160 mm and the outer diameter of the second fan 22b (shown by arrow "i" in FIG. 3) is set for 140 mm.

Further, in the foot/defroster mode (double laminar flow mode), the following effects can be obtained by setting the outer diameter of the first fan 22a to be greater than that of the second fan 22b. In the double laminar flow mode, the amount of air blown into the first air passage 8a while the vehicle is stopped is different from that while the vehicle is running, depending on the ram pressure of air flow generated by the running of the vehicle, so that the amount of blown-air is increased while the vehicle is running although the fan 22 rotates at an identical rotational speed.

In this way, there is a problem that the ratio between the air amount in the first air passage 8a and the air amount in the second air passage 8b varies while the vehicle is running.

Figure 7:
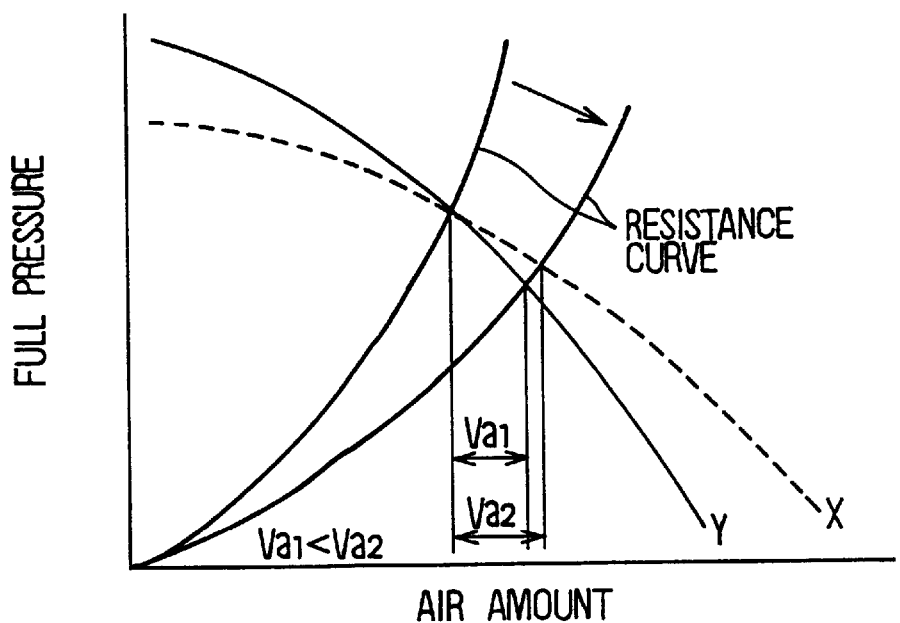
FIG. 7 is a graph showing a relationship between a full pressure and an air amount of a fan in the first embodiment.

In this embodiment, the outer diameter of the first fan 22a is set to be larger so that the adverse influence of the ram pressure caused by the running of the vehicle is suppressed as low as possible. That is, FIG. 7 shows a relationship between an air amount and a full pressure in a general centrifugal type fan. As shown in FIG. 7, if the fan outer diameter is enlarged, the increase ratio of the air amount to the increase of the full pressure of the fan is reduced as from the characteristic A shown by the dotted line to the characteristic Y shown by the solid line. When the ram pressure is applied to the fan, the resistance curve shifts as shown by an arrow in FIG. 7.

Accordingly, the air amount increases by Va2 when a ram pressure is applied to a fan having the characteristic shown by Y. On the other hand, the air amount is increased by Va1 when a ram pressure is applied to a fan having the characteristic Y in FIG. 7. Thus, since Va1 is greater than Va2, the effect of the ram pressure can be suppressed by setting the outer diameter of the fan to be as large as possible.

Figure 8:
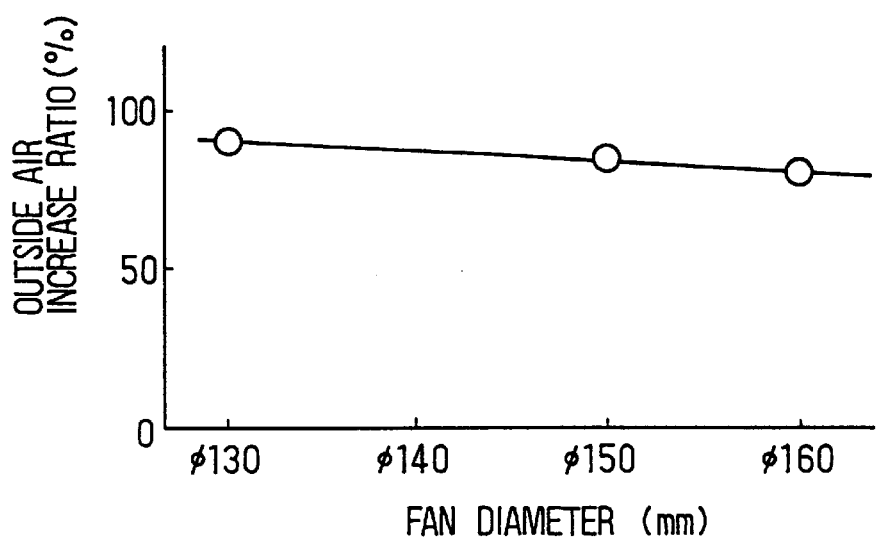
FIG. 8 is a graph showing a relationship between an outer diameter of a fan and an increase ratio of an outside air in the first embodiment.

FIG. 8 shows experimental data studied by the inventors. As can be understood from the data, the increase ratio of the outside air is reduced as the outer diameter of the fan increases. In this experimental data, a voltage applied to the electric motor 23 is maintained constant. The increase ratio of the outside air is represented by the following equation (1).

$$\text{Outside air increase ratio} = (\alpha - \beta)/\beta \times 100(\%) \quad (1)$$

wherein $\alpha$ represents the amount of air blown by the first fan 22a when a speed of the vehicle is 100 km/h, and $\beta$ represents the amount of air blown by the second fan 22b at a vehicle speed of 0 km/h.

Further, in this embodiment, the first fan 22a and the second fan 22b have the following features.

That is, as shown in FIGS. 3 and 4, blade heights of the first fan 22a and the second fan 22a in the axial direction (indicated by arrows "j" and "k" in FIG. 3) are set such that the blade height of the first fan 22a is shorter than that of the second fan 22a. In this embodiment, the blade height of the first fan 22a is 35 mm and the blade height of the second fan 22b is 40 mm.

With a view point of the fan efficiency, there is generally an optimum value for the ratio between the outer diameter and the height of a fan in a centrifugal type multi-blade fan (about 0.5). Since the height of the fan (blade height) relative to the outer diameter of the fan in this embodiment is smaller than the optimum value so that the efficiency of the fan may be lowered.

Figure 9:
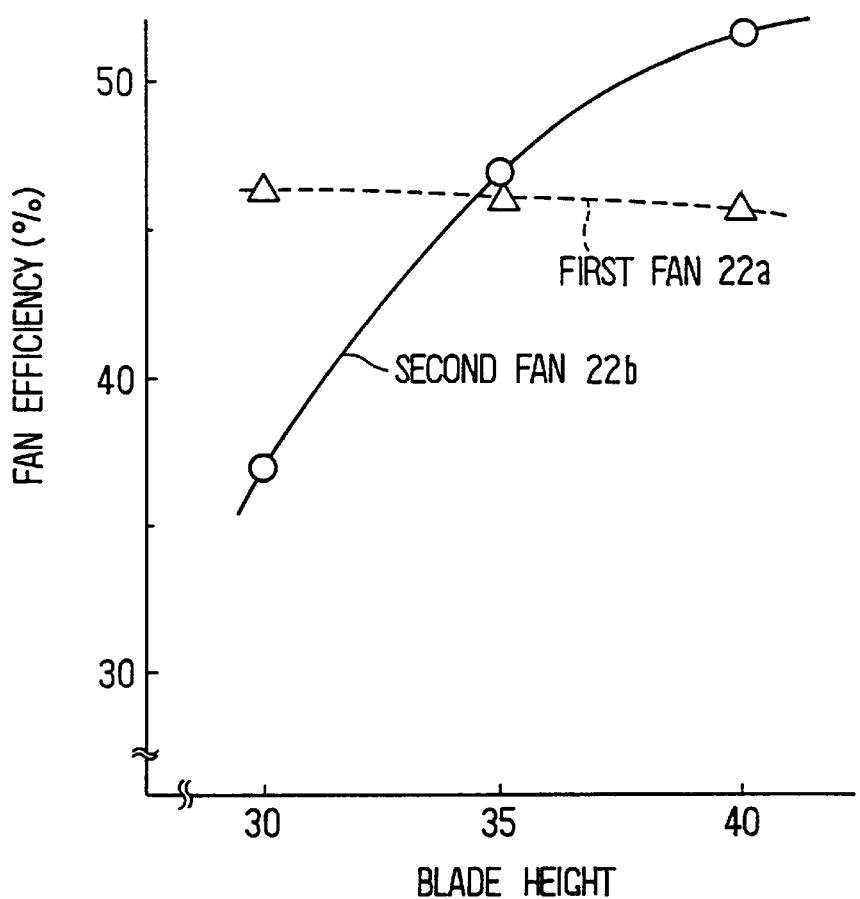
FIG. 9 is a graph showing a relationship between a blade height of a fan and a fan efficiency in the first embodiment.

However, it has been confirmed that the fan efficiency is not lowered in this embodiment, even if the ratio is smaller than the optimum value, because the electric motor 23 is inserted in the suction port 24 of the first fan 22a. FIG. 9 shows experimental data studied by the inventors.

As can be understood from the data, the fan efficiency of the first fan 22a in which the electric motor 23 is inserted in the suction port 24 is substantially unchanged even when the blade height is increased while a fan diameter is maintained constant. This is because, it may be influenced that air is less introduced in the deep portion of the fan blade 22d (in the vicinity of the partition 36) by the electric motor 23.

Accordingly, since the fan efficiency is unchange even if the blade height of the first fan 22a is decreased from the optimum value, the height of the blade is set to be smaller than that of the second fan 22b. Further, the blade height of the second fan 22b is set to the optimum value to improve the fan efficiency of the second fan 22b.

A second embodiment of the present invention will be described.

According to the present invention, it is necessary that the direction of the divided face of the fan casings 20a and 20b extends in the axial direction of the fan 22 and air conditioning functional portions such as the first and the second inside air introduction ports 17a and 17b and the communication passage 103 are provided, as described in the first embodiment. Further, the layout for the air conditioner for the vehicle is different depending on the mounting space and mounting conditions corresponding to respective vehicles, in addition to the layout as shown in the first embodiment.

Accordingly, although the inside air/outside air blower unit 1 can be constructed with four cases in the first embodiment, it has been found according to the study of the inventors that when the layout of the air conditioner for the vehicle is changed corresponding to each of the vehicles, the shape of the case is complicated and the number of divided portions is increased to deteriorate the work efficiency for assembling the case.

In this embodiment, the inside air/outside air blower unit 1 is constructed with four cases for the air conditioner having a different layout from that of the first embodiment, to improve the work efficiency for assembling the case.

Figure 10:
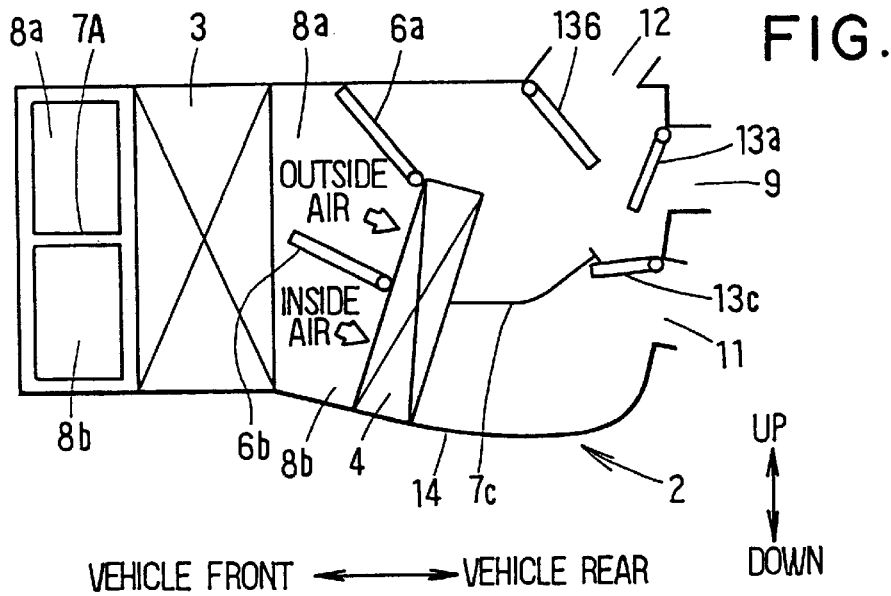
FIG. 10 is a view showing a construction of an air conditioner for a vehicle, according to a second embodiment of the present invention.
Figure 11:
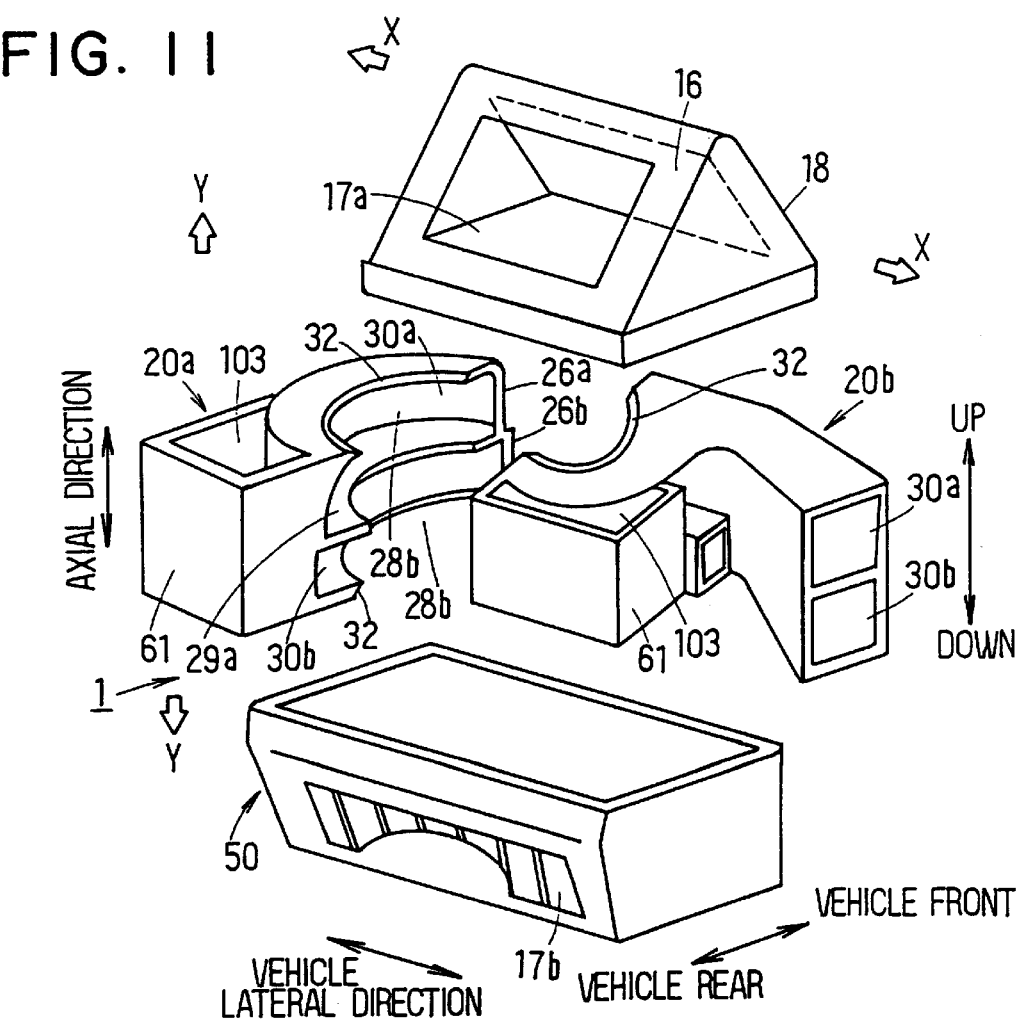
FIG. 11 is an exploded view of an inside air/outside air blower unit in the second embodiment.
Figure 12:
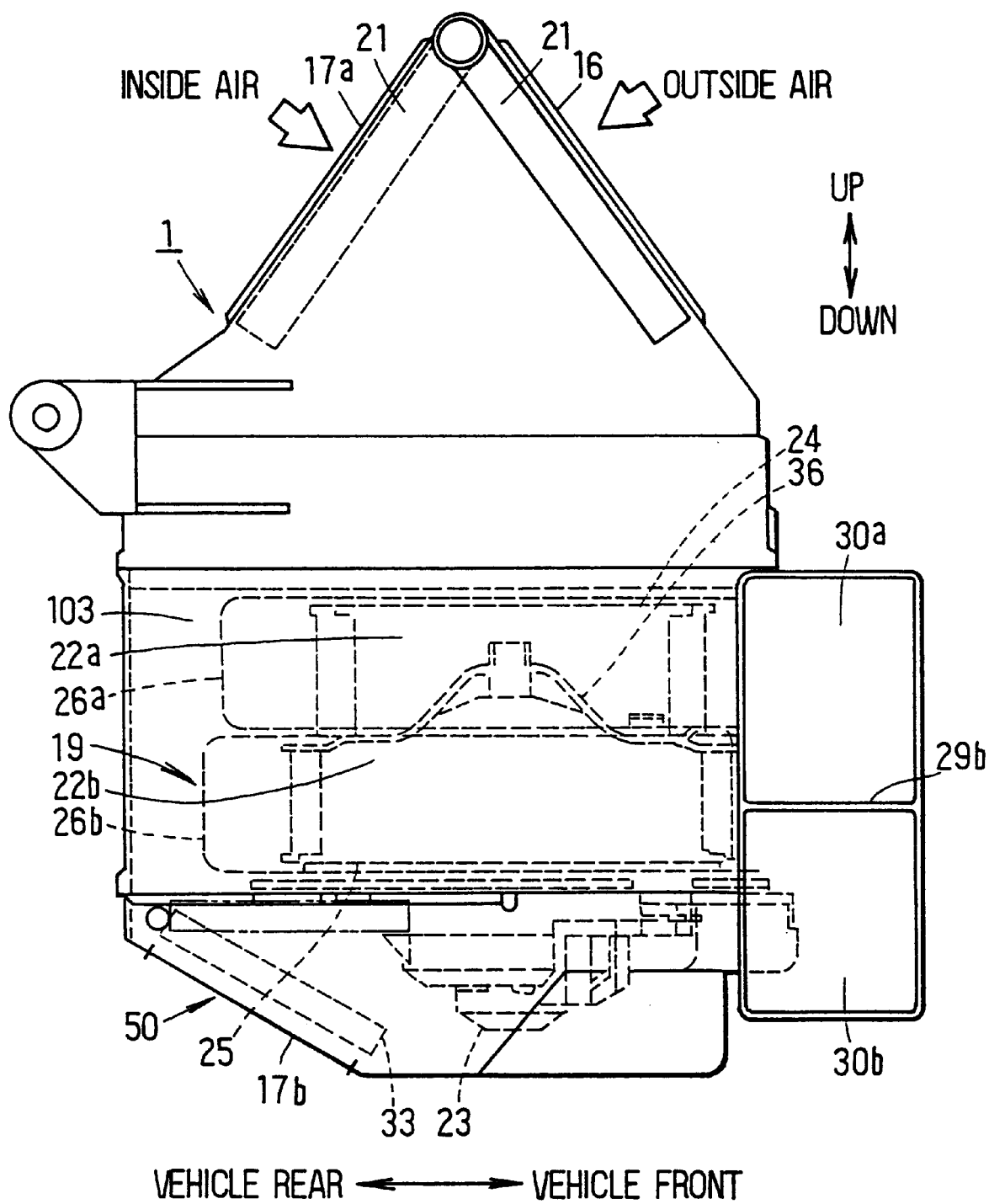
FIG. 12 is a detailed view of an inside air/outside air blower unit in the second embodiment.
Figure 13:
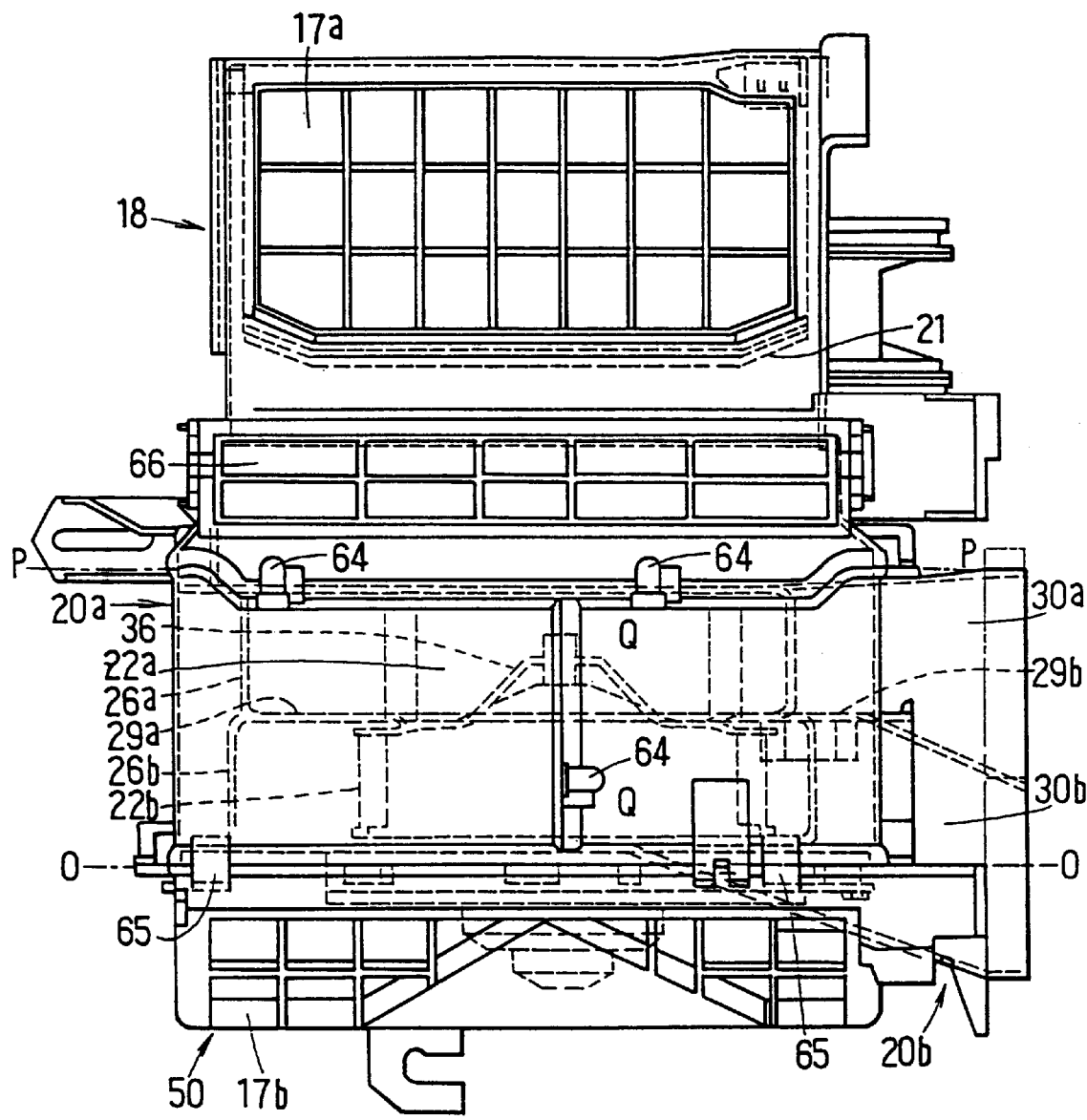
FIG. 13 is a detailed view of an inside air/outside air blower unit in the second embodiment.

FIG. 10 shows an entire construction of an air conditioner unit 2 in this embodiment. FIG. 11 is an exploded view of an inside air/outside air blower unit 1 in this embodiment and FIG. 12 is a schematic side elevational view in a state where the inside air/outside air blower unit 1 is assembled, as viewed from the right to the left in FIG. 11. FIG. 13 is a schematic side elevational view of the unit as viewed from the right to the left in FIG. 12. Components or parts having functions identical to those in the first embodiment are shown by the same reference numerals.

The air conditioner unit 2 in this embodiment will be explained.

An evaporator 3 and a heater core 4 in this embodiment are disposed such that these are disposed in the front-to-back direction of the vehicle as shown in FIG. 10, and conditioned air flows from the front to the back of the vehicle. Air mixing doors 6a and 6b include plate-shaped door members. An interior of the air conditioner unit 2 is partitioned into a first air passage 8a and a second air passage 8b so as to be disposed in parallel in the vertical direction.

In this embodiment, the interior of the air conditioner unit 2 is partitioned into the first air passage 8a and the second air passage 8b as described above. As shown in FIG. 10, the upstream side of the evaporator 3 is partitioned by a partition plate 7A, and the downstream side of the heater core 4 is partitioned by a partition plate 7C. Further, a space between the evaporator 3 and the heater core 3 is partitioned into the first air passage 8a and the second air passage 8b by the air mixing doors 6a and 6b.

That is, when the operational positions of the air mixing doors 6a and 6b shown in FIG. 10 are in the maximum heating state in which all of the air having passed through the evaporator 3 passes through the heater core 4, the interior of the air conditioner unit 2 is partitioned by the air mixing doors 6a and 6b into the first air passage 8a and the second air passage 8b.

In this way, air flowing in the first air passage 8a at the upstream side of the evaporator 3 flows between the two mix doors 6a and 6b and is blown to the first air passage 8a at the downstream side of the heater core 4 as shown in FIG. 10. On the other hand, air flowing in the second air passage 8b at the upstream side of the evaporator 3 is blown by the lower air mixing door 6b and the case 14 into the second air passage 8b at the downstream side of the heater core 4 as shown in FIG. 10.

That is, in this embodiment, the interior of the air conditioner unit 2 is not partitioned into the two air passages, if the air mixing doors 6a and 6b are at the operational positions other than the maximum heating state shown in FIG. 10.

Then, in this embodiment, the inside air/outside air mode is automatically changed into the double laminar flow mode when the air mixed doors 6a and 6b are in the maximum heating state.

In this embodiment, the first air passage 8a is disposed above the second air passage 8b. The reasons will be described below.

The defroster air passage 10 is usually disposed above the air conditioner unit 2 in view of the function. Further, the foot air passage 11 is usually disposed below the air conditioner unit 2 in view of the function.

That is, it is necessary, for example, to dispose the defroster air passage 12 below the air conditioner unit 2 and upraise the conditioned air blown from the defroster air passage 12 by using a duct (not shown) or the like. Accordingly, this occurs a problem in that the arrangement of the duct is complicated. Further, if the foot air passage 11 is disposed above the air conditioner unit 2 for instance, it is necessary to downwardly direct the conditioned air blown from the foot air passage 11 by using a duct (not shown) or the like. As a result, the arrangement of the duct is also complicated in this case.

However, in this embodiment, since first air passage 8a is disposed above the second air passage 8b, the outside air of the first air passage 8a can be blown to the defroster air passage 12, while the inside air in the second air passage 8b can be blown to the foot air passage 11 easily in the double laminar flow mode.

Then, since the first passage 30a and the second passage 30b are formed so as to be disposed in parallel in the vertical direction in this embodiment, the arrangement and the structure of the inside air/outside air blower unit 1 are greatly different from those in the first embodiment.

The inside air/outside air blower unit 1 in this embodiment will be described in details. FIG. 11 is an exploded view for showing four case members constructing the inside air/outside air blower unit 1. FIG. 12 shows an entire perspective view of the inside air/outside air blower unit 1 in a state in which the four cases are assembled in FIG. 11 as viewed from the back side to the front side of the vehicle. FIG. 13 is a schematic view of the unit shown in FIG. 12 as viewed from the right side to the left side. In FIGS. 11 to 13, the directions including the vertical direction, the front-to-back direction, and the like are shown in the state in which the inside air/outside air blower unit 1 is assembled to the vehicle.

In this embodiment, since the first air passage 8a and the second air passage 8b in the air conditioner unit 2 are disposed vertically, the blower 19 is correspondingly disposed such that the axial direction extends in the vertical direction. That is, the blower 19 shown in FIG. 3 or FIG. 4 is disposed so as to be rotated leftwardly by 90 degree. In this way, the first and the second air passages 30a and 30b in the inside air/outside air blower unit 1 are formed such that the air passages extends in the horizontal direction.

Further, in this embodiment, the second fan 22b has a larger outer diameter than that of the first 22a, and the electric motor 23 is correspondingly inserted in the suction port 25 of the second fan 22b from the lower side to the upper side.

Further, in this embodiment, a plate-shaped inside air/outside air switching door 21 is employed instead of the rotary door 21 as means for closing the outside air introduction port 16 and the first inside air introduction port 17a. Further, in this embodiment, a communication passage 103 is formed so as to extend from the upper side to the lower side as shown in FIG. 13.

An operation of the inside air/outside air blower unit 1 in this embodiment will be described briefly. Also in this embodiment, three inside air/outside air modes, that is, the whole inside air mode, whole outside air mode and double laminar flow mode can be set.

(1) Whole Inside Air Mode

The inside air/outside air switching door 21 is operated to the position shown by the solid line in FIG. 12 to open the first inside air introduction port 17a and close the outside air introduction port 16, and the switching door 33 is operated to the position shown by the solid line in the figure to open the second inside air introduction port 17b and close the communication passage 103 (third predetermined position). Then, both of the first and the second fans 22a and 22b suck the inside air, and the inside air is introduced into both of the first passage 30a (first air passage 8a) and the second air passage 20b (second air passage 8b).

(2) Double Laminar Flow Mode

The inside air/outside air switching door 21 is operated to the position shown by the dotted line in FIG. 12 to open the outside air introduction port 16 and close the first inside air introduction port 17b. Further, the switching door 33 is rotated to a position shown by the dotted line in the figure to close the communication passage 103 and open the second internal introduction port 17b (second predetermined position). Then, outside air is introduced to the first fan 22a and blown through the first passage 30a into the first air passage 8a. On the other hand, inside air is introduced to the second fan 22b and blown through the second passage 30b into the second air passage 8b.

(3) Whole Outside Air Mode

The inside air/outside air switching door 21 is rotated to the position shown by the dotted line in FIG. 12 to open the outside air introduction port 16 and close the first inside air introduction port 17a. The switching door 33 is operated to a position shown by the dotted line in the figure to open the communication passage 103 and close the second inside air introduction port 17b (first predetermined position). The outside air from the outside air introduction port 16 is sucked to the first fan 22a, blown through the communication passage 103 from the upper side to the lower side, and is then turned upwardly again and introduced into the second fan 22b. In this way, the outside air is blown through the first and the second air passages 30a and 30b to both of the first and the second air passages 8a and 8b.

Further, in this embodiment, the inside air/outside air blower unit 1 comprises four cases as shown in FIG. 11.

As shown in FIG. 11, in this embodiment, the inside air/outside air blower unit 1 are constructed by assembling the inside air/outside air case 18, the inside air case 50, and the fan casings 20a and 20b, as the four case members, to form the first passage 30a, the second passage 30b and the communication passage 103.

The inside air/outside air case 18 has substantially the same shape as that in the first embodiment, and the outside air introduction port 18 and the first inside air introduction port 17a are molded integrally. The outside air introduction port 18 and the first inside air introduction port 17a are formed so as to be disposed in the front-to-back direction of the vehicle. Further, the inside air/outside air case 18 is disposed at one end (in an upper portion in the vertical direction in the figure as shown in FIG. 11) in the axial direction of rotation of a blower 19 (not shown).

The fan casing 20a is formed with the guide portion 32; however, the guide portion 32 in this embodiment is not protruded outwardly as in the first embodiment. Instead, open end faces of the first suction port 28a and the second suction port 28b are radially enlarged to the outside of the fan casings 20a and 20b as shown in FIG. 21 in this embodiment.

Each of the fan casings 20a and 20b is formed with a duct portion 61 extending vertically as shown in FIG. 11. The two duct portions 61 construct a part of the communication passages 103.

It is not necessary for the communication passage 103 to be constructed by combining the two duct portions 61. That is, in this embodiment, when the fan casings 20a and 20b are assembled, wall portions 61a of the duct portions 61 are joined to each other.

Further, it is not necessary for the wall portion 61a to construct the communication passage. For example, the duct-like communication passage 103 may be constructed by forming a L-shaped duct piece to each of the fan casings 20a and 20b and joining the two duct pieces to each other when the fan casings 20a and 20b are assembled.

However, if the communication passage 103 is constructed by joining the L-shaped duct pieces, the assembling strength is remarkably deteriorated. In this embodiment, the wall portion 61a is formed to improve the assembling strength when the fan casings 20a and 20b are assembled.

The inside air case 50 is formed in a cup-like shape as shown in FIG. 11, to which the second inside air introduction port 17b is formed. The inside air case 50 is disposed, as shown in FIG. 11, to the other end of the fan casings 20a and 20b in the axial direction of the blower 19 (not shown) (a lower portion in the vertical direction of the figure) as shown in FIG. 11. The inside air case 50 is for introducing the outside air blown from the duct 61 formed in the fan casings 20a and 20b to the second suction port 28b in the double laminar flow mode.

Then, a method of assembling the four cases will be described briefly.

Firstly, fitting portions (not shown) for preventing air leakage are formed on the divided faces of the four cases. Specifically, a concave portion is formed on one of the divided faces and a convex portion is formed on the other of divided faces joined with each other. Then, when the four cases are assembled, the concave portion a nd the convex portion are meshed with each other.

Further, the four cases are fastened by fastening means such as machine screws or clips. For example, a boss 64 protruding outwardly is molded integrally to each of the two fan casings 20a and 20b as shown in FIG. 13. Then, the two fan casings 20a and 20b are fastened and secured by screwing tapping screws (not shown) into the boss 64.

Similarly, each of the fan casings 20a and 20b and the inside air/outside air case 18 is formed with a boss 64. Then, the fan casings 20a and 20b and the inside air/outside air case 18 are fastened and fixed by screwing the tapping screws (not shown) into the boss portion 64.

Further, a retainer portion 65 is molded integrally so as to extrude outwardly to each of the fan casings 20a and 20b and the inside air case 50. The fan casings 20a and 20b and the inside air case 50 are fastened and secured by fitting a holding spring (C-shaped metal clip).

In this embodiment, a filter (not shown) for removing dusts or obstacles in air is disposed in the inside air/outside air case 18. In FIG. 13, a cover 66 is for attaching or detaching the filter. Further, the line P—P in FIG. 13 represents a divided face between the inside air/outside air case 18 and the fan casings 20a and 20b, the line Q—Q represents a divided face between the fan casings 20a and 20b, and the line O—O represents a divided face between the inside air case 50 and the fan casings 20a and 20b.

As described above, in this embodiment, the inside air/outside air blower unit 1 is constructed with four components, that is, the fan casings 20a and 20b, the inside air/outside air case 18 and the inside case 50. In this way, the number of divided portions for the case can be decreased to improve the work efficiency for assembling the case. Further, in this embodiment, the blower 19 can be maintained/inspected or attached/detached by removing the inside air case 50.

A third embodiment of the present invention will be described.

In this embodiment, the inside air/out side air blower unit 1 of the second embodiment is construct ed with three cases, and the structure thereof will be described below.

Figure 14:
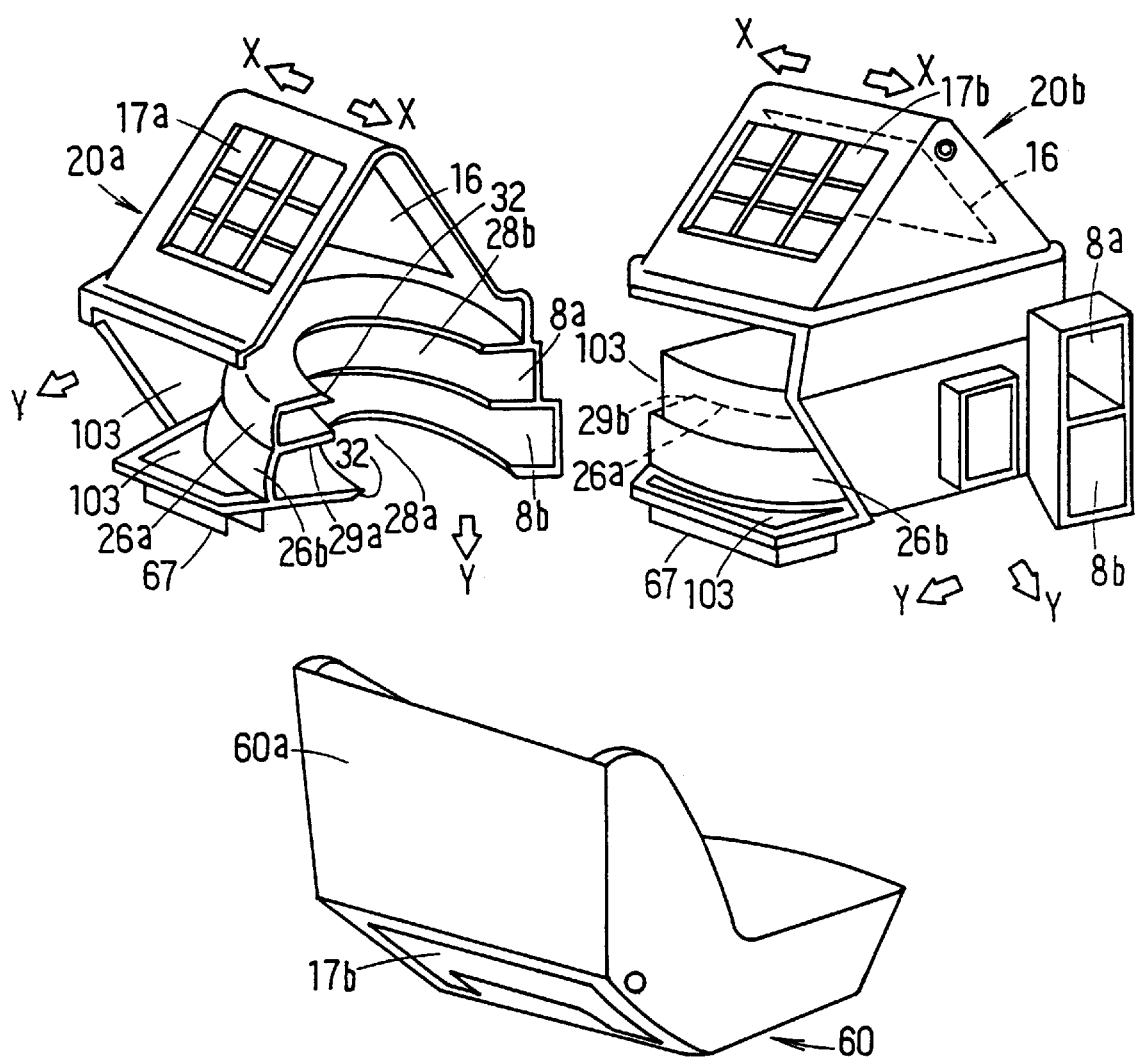
FIG. 14 is an exploded view of an inside air/outside air blower unit in the third embodiment.

FIG. 14 shows an exploded view in which three cases are disassembled. Since the outer shape, the door structure and the inside air passage structure of the inside air/outside air blower unit 1 in this embodiment are quite identical with those shown in FIG. 13, the construction of this embodiment will be understood easily with reference to FIG. 13.

In this embodiment, the inside air/outside air blower unit 1 includes fan casings 20a and 20b, and an inside air case 60.

The fan casings 20a and 20b are integrally molded with the inside air/outside air case 18 in the second embodiment. More specifically, as shown in FIG. 14, the first inside air introduction port 17a and the outside air introduction port 16 are molded integrally to one end in the axial direction of the blower 19 (not shown).

That is, the divided face for the two fan casings 20a and 20b is located just at a position to divide the first inside air introduction port 17a and the outside air introduction port 16. Accordingly, when the two fan casings 20a and 20b are assembled, the first inside air introduction port 17a and the outside air introduction port 16 are formed. Frame-shaped closing portions 67 are formed to a scroll case portion 26b located below in the figure so as to protrude sidewardly to close the communication passage 103. The closing portion 67 constructs a seal portion which contacts the switching door 33 when closing the communication passage 103.

FIG. 14 shows a direction where a die unit for forming the fan casings 20a and 20b is released in this embodiment. When the first inside air introduction port 17a and the outside air introduction port 16 are molded integrally and the communication passage 103 is molded integrally, it is impossible to release the die unit for forming the communication passage 103 having a duct shape. In this embodiment, the fan casings 20a and 20b and the inside air case 60 are combined to form a duct-shaped communication passage 103.

That is, the inside air case 13 is molded integrally such that a wall portion 60a extends upwardly from the position for forming the second inside air introduction port 17b as shown in FIG. 14, and when the inside air casing 6 is assembled to the fan casings 20a and 20b, the wall portions 60a are disposed on the side of the scroll case portions 26a and 26b so as to construct the duct-shaped communication passages 103.

As described above, in this embodiment, the inside air/outside air blower unit 1 is constructed with three components, that is, the fan casings 20a and 20b and the inside air case 60. In this way, the number of divided portions for the case can be reduced to improve the work efficiency for assembling the case.

By the way, the inside air/outside air blower units 1 is constructed with three casings, and the wall portion 60a is formed in the inside air case 60 for constructing the communication passage 103 in this embodiment. Accordingly, the inside air case 60 has a shape bent into a V-shape as shown in FIG. 14. Accordingly, the joining face between the fan casings 20a, 20b and the inside air case 60 is also bent into the V-shape correspondingly.

However, in this case, if the fan casings 20a, 20b and the inside air case 60 are fitted by concave/convex engagement, the concave and convex portions are not fitted satisfactorily even when there is a minute tolerance, and consequently there causes a problem of air leakage.

Accordingly, in the third embodiment described above, the inside air/outside air blower unit is 1 constructed with four cases to overcome the problems, in which the duct-shaped communication passages 103 are formed integrally in the fan casings 20a and 20b. As a result, the shape of the inside case 50 can be simplified to prevent air leakage satisfactorily.

Although the evaporator 3 and the heater core 4 are disposed horizontally in the first embodiment, and the evaporator 3 and the heater core 4 are disposed in the front-to-back direction of the vehicle; however, the present invention may be also employed in a case where the evaporator 3 and the heater core 4 are disposed in the lateral direction of the vehicle.

Further, in each of the above-described embodiments, the outer diameter of the first fan 22a and the second fan 22b may be identical, or the blade height may be identical between the first fan 22a and the second fan 22b.

Further, in each of the embodiments described above, the divided face for the fan casings 20a and 20b is constructed so as to divide along the left-to-right direction in FIG. 1; however, it may be constructed to divide along the vertical direction in FIG. 1. In this case, the divided direction may be determined adequately so as not to disturb the formation of a nose portion 26b on the curved surface in the scroll case portion 26 as shown in FIG. 1.

Figure 15:
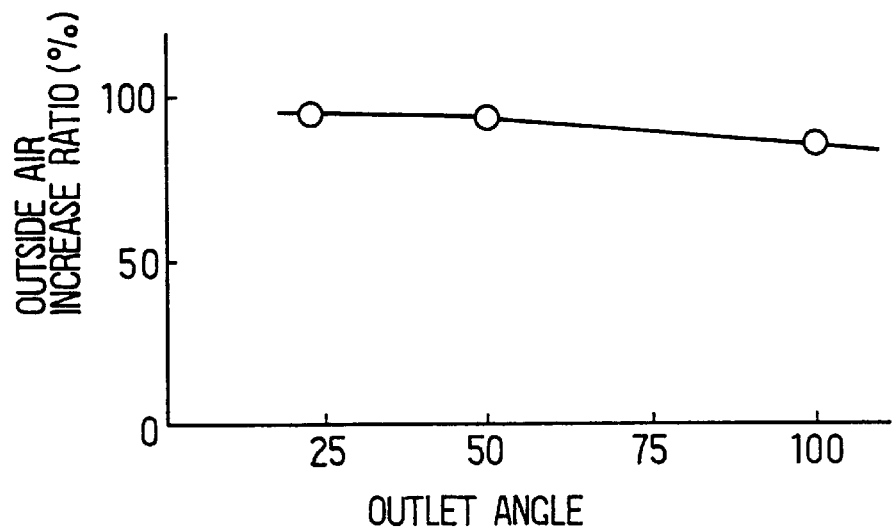
FIG. 15 is a graph showing a relationship between an exit angle of a fan and an increase ratio of outside air in a modification of the present invention.

Further, in the first embodiment, although the outer diameter of the first fan 22a is made larger than the outer diameter of the second fan 22b so as to decrease the increase ratio of the outside air by the ram pressure as low as possible in the first embodiment, the same effect may be obtained also by making an exit angle of the first fan 22a greater than that of the second fan 22b. That is, as the exit angle increases, the slope increases as from characteristic X to characteristic Y in FIG. 7. FIG. 15 shows a relationship between the exit angle and the outside air increase ratio examined by the inventors.

Figure 16:
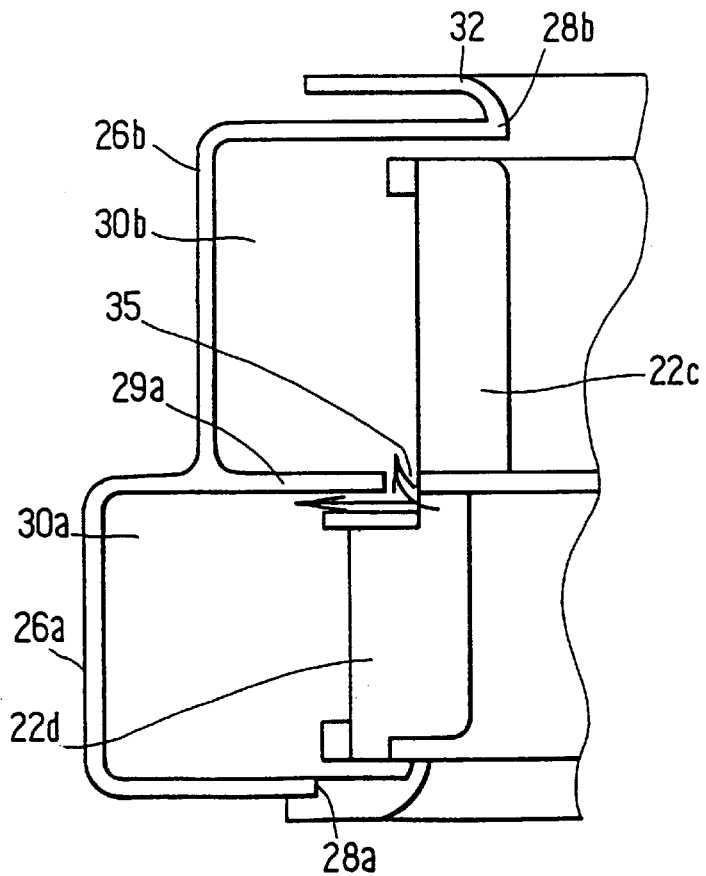
FIG. 16 is a view showing another modification of the present invention.

Further, in each of the embodiments, as shown in FIG. 16, a portion of the partition portion 36 may be recessed to expose a portion of the fan blade 22d to a gap 35, and a slight amount of outside air may be blown compulsorily into the second passage 30b by the exposed portion as shown by an arrow in FIG. 16. In this way, it is possible to prevent the inside air from entering the first air passage 30b from the second passage 30b through the gap 35. Accordingly, it gives a priority on defrosting the windshield.

Figure 17:
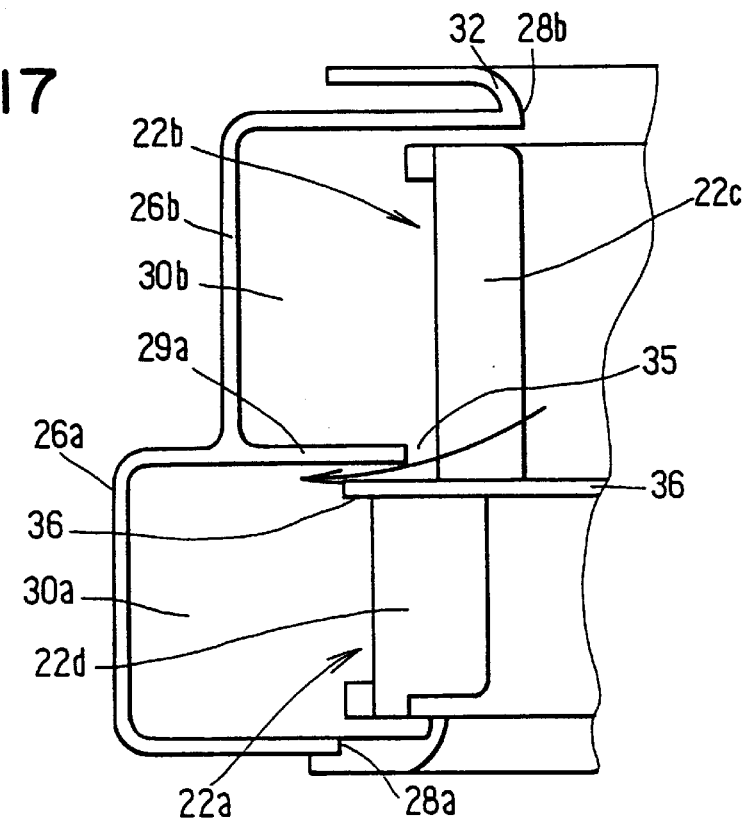
FIG. 17 is a view showing another modification of the present invention.
Figure 18:
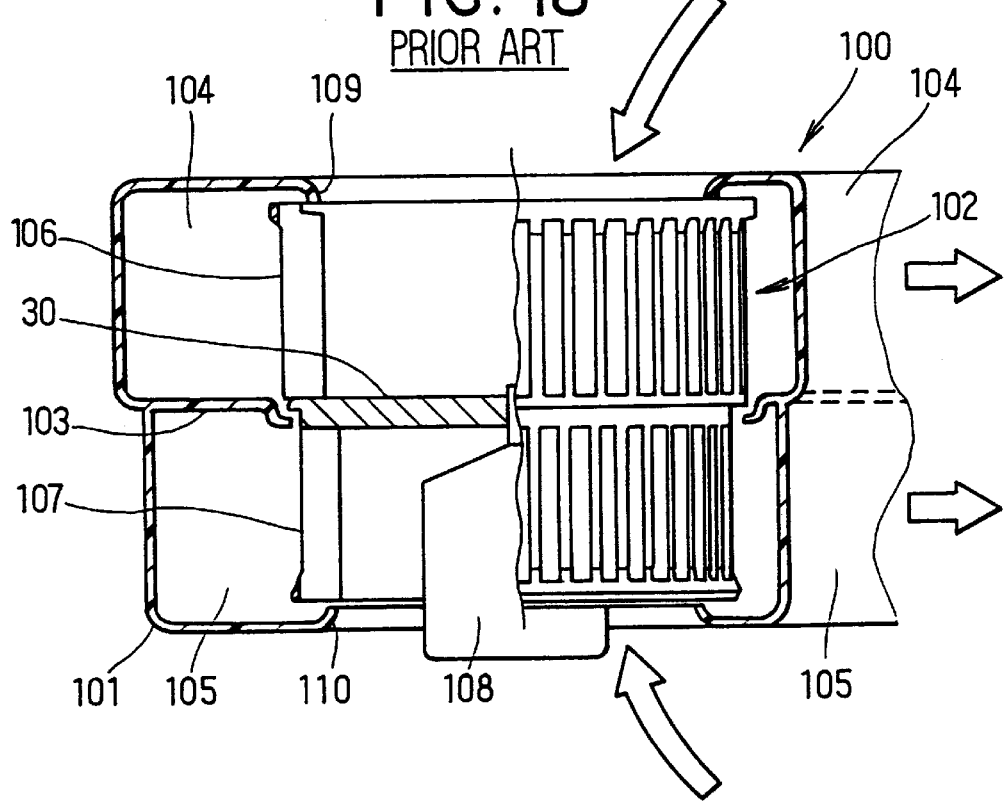
FIG. 18 is a view showing a construction of an inside air/outside air blower unit in the prior art.

To the contrary, as shown in FIG. 17, since a part of the inside air is compulsorily blown through the gap 35 from the second passage 30b into the first passage 30a, it gives a priority on the heating effect.

Further, it is not always necessary in each of the embodiments to integrally mold the first fan 22a and the second fan 22b; however, there may be employed a blower by using a shaft motor for rotating fans 22a and 22b at each end of the shaft.

Further, both of the fan casing 20a and 20b form a part of the communication passage 103 in the third embodiment; however, only one of the fan casings may form the communication passage 103.

Further, in each of the embodiments, the present invention is employed in the blower unit having the double laminar flow mode in which the outside air is introduced into the first passage 30a and the inside air is introduced into the second passage 30b; however, the present invention may be employed in any other blower unit in which different states of air are introduced into two air passages.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. A vehicle air conditioner comprising:
a centrifugal fan having a first fan, a second fan disposed co-axially with, and molded integrally with, the first fan, and a partition portion formed between the first and second fans and extending in a radial direction of the centrifugal fan to partition the first and second fans;
an electric motor for rotating the first and second fans;
fan casings forming a scroll-shaped air passage and housing the centrifugal fan; and
partition walls partitioning an interior of the fan casings into a first passage including the first fan and a second passage in which air differing from that of the first passage flows and including the second fan;
wherein the centrifugal fan is disposed inside of the fan casings so that the partition portion and the partition walls overlap for at least a distance of 3 mm in a radial direction of the centrifugal fan.

2. The vehicle air conditioner of claim 1, wherein the partition walls are substantially planar and extend to an inside of the radial direction of the centrifugal fan from the inner wall surface of the fan casings.

3. The vehicle air conditioner of claim 1, wherein the fan casings form a first suction port for sucking air into the first passage in at a first axial end of the fan casings, and a second suction port for sucking air into the second passage at a second axial end of the fan casings.

4. The vehicle air conditioner of claim 3, wherein the first and second fans have different diameters so that the first and second suction ports are formed with different opening diameters; and
the electric motor is inserted into the suction port associated with one of the first and second fans having a larger diameter.

5. The vehicle air conditioner of claim 1, further comprising:

a cooling heat exchanger disposed at a downstream side of the first and second passages for cooling air passing therethrough;

a heating heat exchanger disposed at the downstream side of the first and second passages, and positioned lower than the cooling heat exchanger, for heating air passing therethrough;

a defroster blower air passage disposed at a downstream side of the heating heat exchanger for supplying air blown into the first passage toward an inner surface of a windshield; and a foot blower air passage disposed at the downstream side of the heating heat exchanger for supplying air blown into the second passage toward a lower passenger compartment space.

6. The vehicle air conditioner of claim 5, wherein the fan casings are disposed in a passenger compartment, and further comprising:

a first inside air introduction port for sucking air inside the passenger compartment into the first suction;

an outside air introduction port for sucking air outside the passenger compartment into the first suction port;

a second inside air introduction port for sucking air inside the passenger compartment into the second suction port;

a communication passage disposed at an upstream side of the first and second suction ports for communicating the first and second suction ports;

a plurality of opening/closing members that open/close the first and second inside air introduction ports and the outside air introduction port;

wherein a full outside air mode is operative for sucking the air outside the passenger compartment into the second suction port through the first communication passage, while the air outside the passenger compartment is sucked into the first suction port through the outside air introduction port when a plurality of the opening/closing members are driven to a first predetermined position;

a dual-air mode is operative for sucking the air inside the passenger compartment into the second suction port through the first and second inside air introduction ports, while the air outside the passenger compartment is sucked into the first suction port through the outside air introduction port when the plurality of the opening/closing members are driven to a second predetermined position; and a full inside air mode is operative for sucking the air inside the passenger compartment into the second suction port through the second inside air introduction port, while the air inside the passenger compartment is sucked into the first suction port through the first inside air introduction port when a plurality of the opening/closing members are driven to a third predetermined position.

7. The vehicle air conditioner of claim 6, wherein:

the first inside air introduction port and the outside air introduction port are integrally molded at a first axial end of the fan casings, and are separated from each other when the fan casings are divided;

an inside air case is integrally molded with the inside air introduction port at a second axial end of the fan casings; and three case members of the two fan casings and the inside air case define the communication passage, the first passage and the second passage.

8. The vehicle air conditioner of claim 6, comprising:

an inside/outside air case disposed at the first axial end of the fan casings for forming the first inside air introduction port and the outside air introduction port;

at least one of the two fan casings being integrally molded with a part of the communication passage to define a duct in the axial direction thereof;

an inside air case disposed at the second axial end of the fan casings for introducing the air outside the passenger compartment blown from a part of the communication passage into the second suction port, with the second inside air introduction port being formed therein; and four case members of the two fan casings, the inside/outside air case and the inside air case defining the communication passage, the first passage and the second passage.

9. The vehicle air conditioner of claim 5, wherein the first and second passages are disposed vertically in parallel with each other such that the first passage is disposed above the second passage.

* * * * *